(12) United States Patent
Gunzelmann

(10) Patent No.: US 12,237,585 B2
(45) Date of Patent: Feb. 25, 2025

(54) ELECTRONIC DEVICES WITH HIGH FREQUENCY MULTIMODE COMMUNICATION CAPABILITIES

(71) Applicant: Apple Inc., Cupertino, CA (US)

(72) Inventor: Bertram R Gunzelmann, Koenigsbrunn (DE)

(73) Assignee: Apple Inc., Cupertino, CA (US)

( * ) Notice: Subject to any disclaimer, the term of this patent is extended or adjusted under 35 U.S.C. 154(b) by 370 days.

(21) Appl. No.: 17/827,120

(22) Filed: May 27, 2022

(65) Prior Publication Data
US 2023/0087648 A1 Mar. 23, 2023

Related U.S. Application Data

(60) Provisional application No. 63/246,719, filed on Sep. 21, 2021.

(51) Int. Cl.
*H01Q 3/26* (2006.01)
*H01Q 15/24* (2006.01)
*H04B 10/50* (2013.01)

(52) U.S. Cl.
CPC .......... *H01Q 3/2676* (2013.01); *H01Q 15/24* (2013.01); *H04B 10/502* (2013.01)

(58) Field of Classification Search
CPC ........ H01Q 3/2676; H01Q 15/24; H01Q 1/24; H01Q 1/243; H04B 10/502; H04B 10/25759; H04J 14/07
See application file for complete search history.

(56) References Cited

U.S. PATENT DOCUMENTS

| | | | |
|---|---|---|---|
| 2013/0177319 A1* | 7/2013 | Middleton | H01Q 3/2676 398/115 |
| 2015/0188660 A1 | 7/2015 | Byun et al. | |
| 2017/0294720 A1* | 10/2017 | Murakowski | H01Q 15/14 |
| 2020/0112384 A1 | 4/2020 | Yu | |

(Continued)

OTHER PUBLICATIONS

Guifang Li et al., Space-division multiplexing: the next frontier in optical communication, Advance in Optics and Photonics, Dec. 2014, pp. 413-487, Optica Publishing Group, Washington D.C., United States.

(Continued)

*Primary Examiner* — Awat M Salih
(74) *Attorney, Agent, or Firm* — Treyz Law Group, P.C.; Michael H. Lyons

(57) ABSTRACT

A wireless system may include a central processor and an access point. The central processor may generate an optical signal on an optical fiber. The optical signal may include an optical local oscillator (LO) signal and one or more carriers. The central processor may modulate different combinations of transverse optical modes, orbital angular momentum, polarization, and/or carrier frequency of the optical signal to concurrently convey respective wireless data streams. The orthogonality of the transverse optical modes, orbital angular momentum, polarization, and carrier frequency may allow many wireless data streams to be modulated onto the optical signal and concurrently transmitted and propagated on the optical fiber independent of each other for transmission to one or more external devices.

20 Claims, 13 Drawing Sheets

(56) References Cited

U.S. PATENT DOCUMENTS

2021/0021053 A1    1/2021  Sasaki et al.
2021/0376465 A1*  12/2021  Dastjerdi ............... H01P 1/185

OTHER PUBLICATIONS

Abderrahmen Trichili et al., Communicating Using Spatial Mode Multiplexing: Potentials, Challenges and Perspectives, IEEE Communications Surveys & Tutorials, May 2019, IEEE, New York, New York, United States.
Ezra Ip et al., 146λ×6×19-Gbaud Wavelength- and Mode-Division Multiplexed Transmission over 10×50-km Spans of Few-Mode Fiber with a Gain-Equalized Few-Mode EDFA, Optical Society of America, Nov. 2013, IEEE, New York, New York, United States.

* cited by examiner

ELECTRONIC DEVICES WITH HIGH FREQUENCY MULTIMODE COMMUNICATION CAPABILITIES

This application claims the benefit of U.S. Provisional Patent Application No. 63/246,719, filed Sep. 21, 2021, which is hereby incorporated by reference herein in its entirety.

FIELD

This disclosure relates generally to electronic devices and, more particularly, to electronic devices with wireless circuitry.

BACKGROUND

Electronic devices can be provided with wireless capabilities. An electronic device with wireless capabilities has wireless circuitry that includes one or more antennas. The wireless circuitry is used to perform communications using radio-frequency signals conveyed by the antennas.

As software applications on electronic devices become more data-intensive over time, demand has grown for electronic devices that support wireless communications at higher data rates. However, the maximum data rate supported by electronic devices is limited by the frequency of the radio-frequency signals. In addition, it can be desirable for the electronic device to be able to communicate using multiple data streams and/or with multiple external devices at once.

SUMMARY

A wireless communication system may include a central optical processor and an access point. The central optical processor may generate an optical signal on an optical fiber. The optical signal may include an optical local oscillator (LO) signal and one or more carriers offset in frequency from the optical LO signal. The central optical processor may modulate different combinations of transverse optical modes, orbital angular momentum, polarization, and/or carrier frequency of the optical signal to concurrently convey respective wireless data streams. The orthogonality of the transverse optical modes, orbital angular momentum, polarization, and carrier frequency may allow many wireless data streams to be modulated onto the optical signal and concurrently transmitted and propagated on the optical fiber independent of each other for transmission to one or more external devices.

The optical signal may be provided to an access point over the optical fiber. The optical signal may illuminate photodiodes at the access point. Each photodiode may produce wireless signals using antenna radiating elements based on the optical LO signal and a respective combination of transverse optical modes, orbital angular momentum, polarization, and/or carrier frequency of the optical signal. In other words, each photodiode may transmit wireless signals that carrier a respective one of the wireless data streams. The wireless signals may be at frequencies determined by the difference between the frequency of the optical LO signal and the corresponding carrier frequency. The wireless signals may, for example, be transmitted at frequencies greater than or equal to 100 GHz.

An aspect of the disclosure provides a communication system. The communication system can include optical components configured to generate an optical signal having a first data stream modulated onto a first transverse mode of the optical signal and having a second data stream modulated onto a second transverse mode of the optical signal, the second transverse mode being orthogonal to the first transverse mode. The communication system can include a light source configured to add an optical local oscillator (LO) signal to the optical signal. The communication system can include a first antenna radiating element. The communication system can include a first photodiode coupled to the first antenna radiating element, the first photodiode being configured to transmit first wireless signals over the first antenna radiating element based on the optical LO signal and the first transverse mode of the optical signal. The communication system can include a second antenna radiating element. The communication system can include a second photodiode coupled to the second antenna radiating element, the second photodiode being configured to transmit second wireless signals over the second antenna radiating element based on the optical LO signal and the second transverse mode of the optical signal.

An aspect of the disclosure provides a communication system. The communication system can include an optical fiber. The communication system can include optical components configured to generate an optical signal on the optical fiber, the optical signal having a first data stream and a second data stream modulated onto the optical signal, the first data stream being carried by a first orbital angular momentum of the optical signal, and the second data stream being carried by a second orbital angular momentum of the optical signal that is opposite the first orbital angular momentum. The communication system can include a light source configured to generate an optical local oscillator (LO) signal in the optical signal. The communication system can include a first antenna radiating element. The communication system can include a first photodiode coupled to the first antenna radiating element, the first photodiode being configured to transmit first wireless signals over the first antenna radiating element based on the optical LO signal and the first orbital angular momentum of the optical signal. The communication system can include a second antenna radiating element. The communication system can include a second photodiode coupled to the second antenna radiating element, the second photodiode being configured to transmit second wireless signals over the second antenna radiating element based on the optical LO signal and the second orbital angular momentum of the optical signal.

An aspect of the disclosure provides a method of operating a communication system. The method can include modulating a first wireless data stream onto a first transverse mode of an optical signal at a carrier frequency. The method can include modulating a second wireless data stream onto a second transverse mode of the optical signal at the carrier frequency, the second transverse mode being orthogonal to the first transverse mode. The method can include with one or more optical fibers, illuminating a first photodiode using the first transverse mode of the optical signal and an optical local oscillator (LO) signal and illuminating a second photodiode using the second transverse mode of the optical signal and the optical LO signal. The method can include with the first photodiode, transmitting the first wireless data stream to a first device at a frequency greater than or equal to 100 GHz over a first antenna radiating element using the first transverse mode of the optical signal and the optical LO signal. The method can include with the second photodiode, transmitting the second wireless data stream to a second device at the frequency over a second antenna radiating element using the second transverse mode of the optical signal and the optical LO signal.

DETAILED DESCRIPTION

Figure 1:
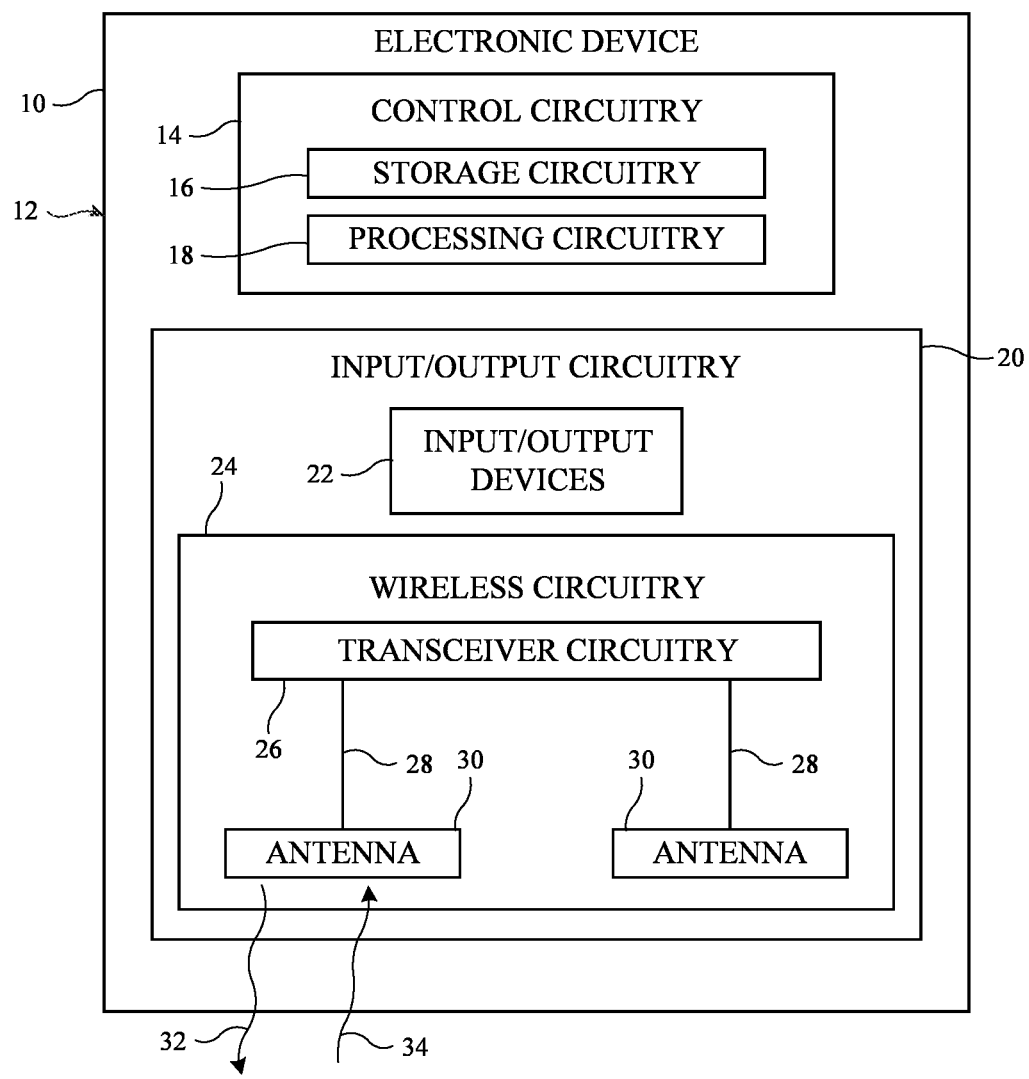
FIG. 1 is a block diagram of an illustrative electronic device having wireless circuitry with at least one antenna that conveys wireless signals at frequencies greater than about 100 GHz in accordance with some embodiments.

Electronic device 10 of FIG. 1 (sometimes referred to herein as electro-optical device 10) may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses, goggles, or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors, microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, Sixth Generation (6G) protocols, sub-THz protocols, THz protocols, etc.), antenna diversity protocols, satellite navigation system protocols (e.g., global positioning system (GPS) protocols, global navigation satellite system (GLONASS) protocols, etc.), antenna-based spatial ranging protocols, optical communications protocols, or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications. Wireless circuitry 24 (sometimes referred to herein as wireless communications circuitry 24) may include one or more antennas 30. Wireless circuitry 24 may also include transceiver circuitry 26. Transceiver circuitry 26 may include transmitter circuitry, receiver circuitry, modulator circuitry, demodulator circuitry (e.g., one or more modems), radio-frequency circuitry, one or more radios, intermediate frequency circuitry, optical transmitter circuitry, optical receiver circuitry, optical light sources, other optical components, baseband circuitry (e.g., one or more baseband processors), amplifier circuitry, clocking circuitry such as one or more local oscillators and/or phase-locked loops, memory, one or more registers, filter circuitry, switching circuitry, analog-to-digital converter (ADC) circuitry, digital-to-analog converter (DAC) circuitry, radio-frequency transmission lines, optical fibers, and/or any other circuitry for transmitting and/or receiving wireless signals using antennas 30. The components of transceiver circuitry 26 may be implemented on one integrated circuit, chip, system-on-chip (SOC), die, printed circuit board, substrate, or package, or the components of transceiver circuitry 26 may be distributed across two or more integrated circuits, chips, SOCs, printed circuit boards, substrates, and/or packages.

The example of FIG. 1 is merely illustrative. While control circuitry 14 is shown separately from wireless circuitry 24 in the example of FIG. 1 for the sake of clarity, wireless circuitry 24 may include processing circuitry (e.g., one or more processors) that forms a part of processing circuitry 18 and/or storage circuitry that forms a part of storage circuitry 16 of control circuitry 14 (e.g., portions of control circuitry 14 may be implemented on wireless circuitry 24). As an example, control circuitry 14 may include baseband circuitry (e.g., one or more baseband processors), digital control circuitry, analog control circuitry, and/or other control circuitry that forms part of wireless circuitry 24. The baseband circuitry may, for example, access a communication protocol stack on control circuitry 14 (e.g., storage circuitry 20) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer.

Transceiver circuitry 26 may be coupled to each antenna 30 in wireless circuitry 24 over a respective signal path 28. Each signal path 28 may include one or more radio-frequency transmission lines, waveguides, optical fibers, and/or any other desired lines/paths for conveying wireless signals between transceiver circuitry 26 and antenna 30. Antennas 30 may be formed using any desired antenna structures for conveying wireless signals. For example, antennas 30 may include antennas with resonating elements that are formed from dipole antenna structures, planar dipole antenna structures (e.g., bowtie antenna structures), slot antenna structures, loop antenna structures, patch antenna structures, inverted-F antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antennas 30 over time.

If desired, two or more of antennas 30 may be integrated into a phased antenna array (sometimes referred to herein as a phased array antenna) in which each of the antennas conveys wireless signals with a respective phase and magnitude that is adjusted over time so the wireless signals constructively and destructively interfere to produce (form) a signal beam in a given pointing direction. The term "convey wireless signals" as used herein means the transmission and/or reception of the wireless signals (e.g., for performing unidirectional and/or bidirectional wireless communications with external wireless communications equipment). Antennas 30 may transmit the wireless signals by radiating the signals into free space (or to free space through intervening device structures such as a dielectric cover layer). Antennas 30 may additionally or alternatively receive the wireless signals from free space (e.g., through intervening devices structures such as a dielectric cover layer). The transmission and reception of wireless signals by antennas 30 each involve the excitation or resonance of antenna currents on an antenna resonating (radiating) element in the antenna by the wireless signals within the frequency band(s) of operation of the antenna.

Transceiver circuitry 26 may use antenna(s) 30 to transmit and/or receive wireless signals that convey wireless communications data between device 10 and external wireless communications equipment (e.g., one or more other devices such as device 10, a wireless access point or base station, etc.). The wireless communications data may be conveyed bidirectionally or unidirectionally. The wireless communications data may, for example, include data that has been encoded into corresponding data packets such as wireless data associated with a telephone call, streaming media content, internet browsing, wireless data associated with software applications running on device 10, email messages, etc.

Additionally or alternatively, wireless circuitry 24 may use antenna(s) 30 to perform wireless sensing operations. The sensing operations may allow device 10 to detect (e.g., sense or identify) the presence, location, orientation, and/or velocity (motion) of objects external to device 10. Control circuitry 14 may use the detected presence, location, orientation, and/or velocity of the external objects to perform any desired device operations. As examples, control circuitry 14 may use the detected presence, location, orientation, and/or velocity of the external objects to identify a corresponding user input for one or more software applications running on device 10 such as a gesture input performed by the user's hand(s) or other body parts or performed by an external stylus, gaming controller, head-mounted device, or other peripheral devices or accessories, to determine when one or more antennas 30 needs to be disabled or provided with a reduced maximum transmit power level (e.g., for satisfying regulatory limits on radio-frequency exposure), to determine how to steer (form) a radio-frequency signal beam produced by antennas 30 for wireless circuitry 24 (e.g., in scenarios where antennas 30 include a phased array of antennas 30), to map or model the environment around device 10 (e.g., to produce a software model of the room where device 10 is located for use by an augmented reality application, gaming application, map application, home design application, engineering application, etc.), to detect the presence of obstacles in the vicinity of (e.g., around) device 10 or in the direction of motion of the user of device 10, etc.

Wireless circuitry 24 may transmit and/or receive wireless signals within corresponding frequency bands of the electromagnetic spectrum (sometimes referred to herein as communications bands or simply as "bands"). The frequency bands handled by communications circuitry 26 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-100 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Over time, software applications on electronic devices such as device 10 have become more and more data intensive. Wireless circuitry on the electronic devices therefore needs to support data transfer at higher and higher data rates. In general, the data rates supported by the wireless circuitry are proportional to the frequency of the wireless signals conveyed by the wireless circuitry (e.g., higher frequencies can support higher data rates than lower frequencies). Wireless circuitry 24 may convey centimeter and millimeter wave signals to support relatively high data rates (e.g., because centimeter and millimeter wave signals are at relatively high frequencies between around 10 GHz and 100 GHz). However, the data rates supported by centimeter and millimeter wave signals may still be insufficient to meet all the data transfer needs of device 10. To support even higher data rates such as data rates up to 5-10 Gbps or higher, wireless circuitry 24 may convey wireless signals at frequencies greater than 100 GHz.

As shown in FIG. 1, wireless circuitry 24 may transmit wireless signals 32 and may receive wireless signals 34 at frequencies greater than around 100 GHz. Wireless signals 32 and 34 may sometimes be referred to herein as tremendously high frequency (THF) signals 32 and 34, sub-THz signals 32 and 34, THz signals 32 and 34, or sub-millimeter wave signals 32 and 34. THF signals 32 and 34 may be at sub-THz or THz frequencies such as frequencies between 100 GHz and 1 THz, between 100 GHz and 10 THz, between 100 GHz and 2 THz, between 200 GHz and 1 THz, between 300 GHz and 1 THz, between 300 GHz and 2 THz, between 300 GHz and 10 THz, between 100 GHz and 800 GHz, between 200 GHz and 1.5 THz, etc. (e.g., within a sub-THz, THz, THF, or sub-millimeter frequency band such as a 6G frequency band). The high data rates supported by these frequencies may be leveraged by device 10 to perform cellular telephone voice and/or data communications (e.g., while supporting spatial multiplexing to provide further data bandwidth), to perform spatial ranging operations such as radar operations to detect the presence, location, and/or velocity of objects external to device 10, to perform automotive sensing (e.g., with enhanced security), to perform health/body monitoring on a user of device 10 or another person, to perform gas or chemical detection, to form a high data rate wireless connection between device 10 and another device or peripheral device (e.g., to form a high data rate connection between a display driver on device 10 and a display that displays ultra-high resolution video), to form a remote radio head (e.g., a flexible high data rate connection), to form a THF chip-to-chip connection within device 10 that supports high data rates (e.g., where one antenna 30 on a first chip in device 10 transmits THF signals 32 to another antenna 30 on a second chip in device 10), and/or to perform any other desired high data rate operations.

Space is at a premium within electronic devices such as device 10. In some scenarios, different antennas 30 are used to transmit THF signals 32 than are used to receive THF signals 34. However, handling transmission of THF signals 32 and reception of THF signals 34 using different antennas 30 can consume an excessive amount of space and other resources within device 10 because two antennas 30 and signal paths 28 would be required to handle both transmission and reception. To minimize space and resource consumption within device 10, the same antenna 30 and signal path 28 may be used to both transmit THF signals 32 and to receive THF signals 34. If desired, multiple antennas 30 in wireless circuitry 24 may transmit THF signals 32 and may receive THF signals 34. The antennas may be integrated into a phased antenna array that transmits THF signals 32 and that receives THF signals 34 within a corresponding signal beam oriented in a selected beam pointing direction.

It can be challenging to incorporate components into wireless circuitry 24 that support wireless communications at these high frequencies. If desired, transceiver circuitry 26 and signal paths 28 may include optical components that convey optical signals to support the transmission of THF signals 32 and the reception of THF signals 34 in a space and resource-efficient manner. The optical signals may be used in transmitting THF signals 32 at THF frequencies and in receiving THF signals 34 at THF frequencies.

Figure 2:
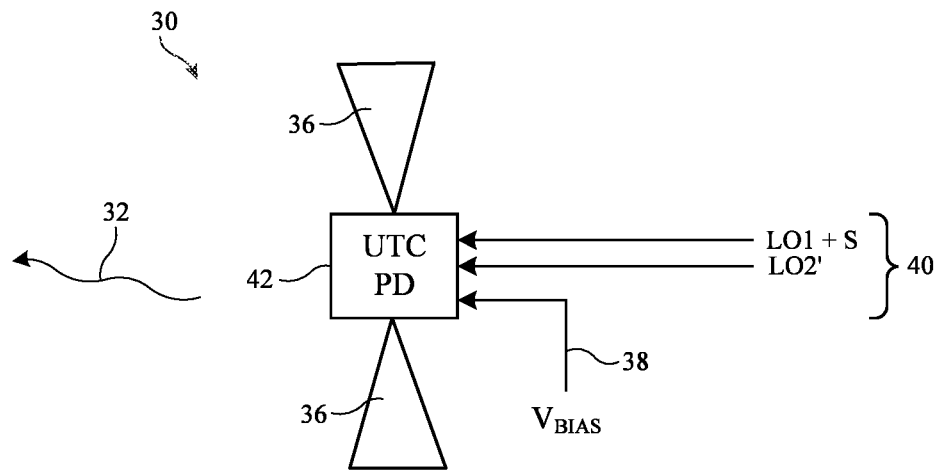
FIG. 2 is a top view of an illustrative antenna that transmits wireless signals at frequencies greater than about 100 GHz based on optical local oscillator (LO) signals in accordance with some embodiments.

FIG. 2 is a diagram of an illustrative antenna 30 that may be used to both transmit THF signals 32 and to receive THF signals 34 using optical signals. Antenna 30 may include one or more antenna radiating (resonating) elements such as radiating (resonating) element arms 36. In the example of FIG. 2, antenna 30 is a planar dipole antenna (sometimes referred to as a "bowtie" antenna) having two opposing radiating element arms 36 (e.g., bowtie arms or dipole arms). This is merely illustrative and, in general, antenna 30 may be any type of antenna having any desired antenna radiating element architecture.

As shown in FIG. 2, antenna 30 includes a photodiode (PD) 42 coupled between radiating element arms 36. Electronic devices that include antennas 30 with photodiodes 42 such as device 10 may sometimes also be referred to as electro-optical devices (e.g., electro-optical device 10). Photodiode 42 may be a programmable photodiode. An example in which photodiode 42 is a programmable uni-travelling-carrier photodiode (UTC PD) is described herein as an example. Photodiode 42 may therefore sometimes be referred to herein as UTC PD 42 or programmable UTC PD 42. This is merely illustrative and, in general, photodiode 42 may include any desired type of adjustable/programmable photodiode or component that converts electromagnetic energy at optical frequencies to current at THF frequencies on radiating element arms 36 and/or vice versa. Each radiating element arm 36 may, for example, have a first edge at UTC PD 42 and a second edge opposite the first edge that is wider than the first edge (e.g., in implementations where antenna 30 is a bowtie antenna). Other radiating elements may be used if desired.

UTC PD 42 may have a bias terminal 38 that receives one or more control signals $V_{BIAS}$. Control signals $V_{BIAS}$ may include bias voltages provided at one or more voltage levels and/or other control signals for controlling the operation of UTC PD 42 such as impedance adjustment control signals for adjusting the output impedance of UTC PD 42. Control circuitry 14 (FIG. 1) may provide (e.g., apply, supply, assert, etc.) control signals $V_{BIAS}$ at different settings (e.g., values, magnitudes, etc.) to dynamically control (e.g., program or adjust) the operation of UTC PD 42 over time. For example, control signals $V_{BIAS}$ may be used to control whether antenna 30 transmits THF signals 32 or receives THF signals 34. When control signals $V_{BIAS}$ include a bias voltage asserted at a first level or magnitude, antenna 30 may be configured to transmit THF signals 32. When control signals $V_{BIAS}$ include a bias voltage asserted at a second level or magnitude, antenna 30 may be configured to receive THF signals 34. In the example of FIG. 2, control signals $V_{BIAS}$ include the bias voltage asserted at the first level to configure antenna 30 to transmit THF signals 32. If desired, control signals $V_{BIAS}$ may also be adjusted to control the waveform of the THF signals (e.g., as a squaring function that preserves the modulation of incident optical signals, a linear function, etc.), to perform gain control on the signals conveyed by antenna 30, and/or to adjust the output impedance of UTC PD 42.

As shown in FIG. 2, UTC PD 42 may be optically coupled to optical path 40. Optical path 40 may include one or more optical fibers or waveguides. UTC PD 42 may receive optical signals from transceiver circuitry 26 (FIG. 1) over optical path 40. The optical signals may include a first optical local oscillator (LO) signal LO1 and a second optical local oscillator signal LO2. Optical local oscillator signals LO1 and LO2 may be generated by light sources in transceiver circuitry 26 (FIG. 1). Optical local oscillator signals LO1 and LO2 may be at optical wavelengths (e.g., between 400 nm and 700 nm), ultra-violet wavelengths (e.g., near-ultra-violet or extreme ultraviolet wavelengths), and/or infrared wavelengths (e.g., near-infrared wavelengths, mid-infrared wavelengths, or far-infrared wavelengths). Optical local oscillator signal LO2 may be offset in wavelength from optical local oscillator signal LO1 by a wavelength offset X. Wavelength offset X may be equal to the wavelength of the THF signals conveyed by antenna 30 (e.g., between 100 GHz and 1 THz (1000 GHz), between 100 GHz and 2 THz, between 300 GHz and 800 GHz, between 300 GHz and 1 THz, between 300 and 400 GHz, etc.).

During signal transmission, wireless data (e.g., wireless data packets, symbols, frames, etc.) may be modulated onto optical local oscillator signal LO2 to produce modulated optical local oscillator signal LO2'. If desired, optical local oscillator signal LO1 may be provided with an optical phase shift S. Optical path 40 may illuminate UTC PD 42 with optical local oscillator signal LO1 (plus the optical phase shift S when applied) and modulated optical local oscillator signal LO2'. If desired, lenses or other optical components may be interposed between optical path 40 and UTC PD 42 to help focus the optical local oscillator signals onto UTC PD 42.

UTC PD 42 may convert optical local oscillator signal LO1 and modulated local oscillator signal LO2' (e.g., beats between the two optical local oscillator signals) into antenna currents that run along the perimeter of radiating element arms 36. The frequency of the antenna currents is equal to the frequency difference between local oscillator signal LO1 and modulated local oscillator signal LO2'. The antenna currents may radiate (transmit) THF signals 32 into free space. Control signal $V_{BIAS}$ may control UTC PD 42 to convert the optical local oscillator signals into antenna currents on radiating element arms 36 while preserving the modulation and thus the wireless data on modulated local oscillator signal LO2' (e.g., by applying a squaring function to the signals). THF signals 32 will thereby carry the modulated wireless data for reception and demodulation by external wireless communications equipment.

Figure 3:
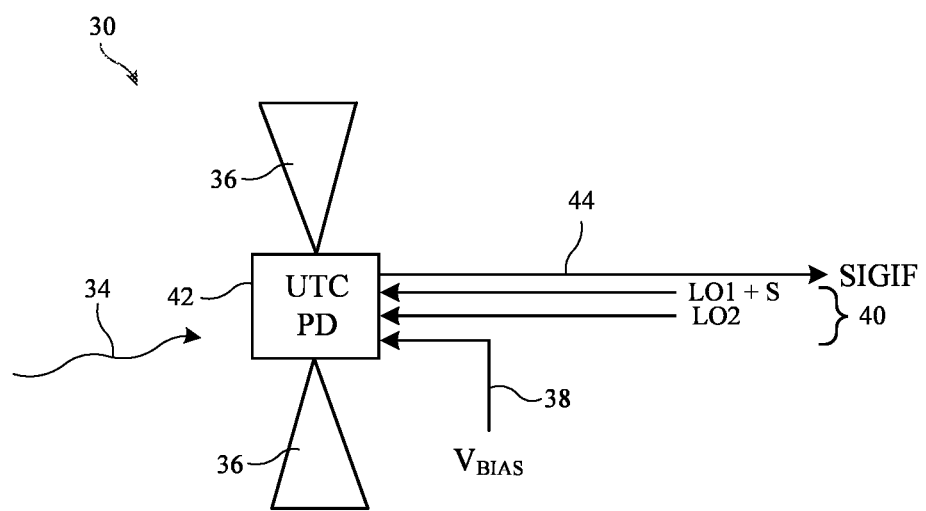
FIG. 3 is a top view showing how an illustrative antenna of the type shown in FIG. 2 may convert received wireless signals at frequencies greater than about 100 GHz into intermediate frequency signals based on optical LO signals in accordance with some embodiments.

FIG. 3 is a diagram showing how antenna 30 may receive THF signals 34 (e.g., after changing the setting of control signals $V_{BIAS}$ into a reception state from the transmission state of FIG. 2). As shown in FIG. 3, THF signals 34 may be incident upon antenna radiating element arms 36. The incident THF signals 34 may produce antenna currents that flow around the perimeter of radiating element arms 36. UTC PD 42 may use optical local oscillator signal LO1 (plus the optical phase shift S when applied), optical local oscillator signal LO2 (e.g., without modulation), and control signals $V_{BIAS}$ (e.g., a bias voltage asserted at the second level) to convert the received THF signals 34 into intermediate frequency signals SIGIF that are output onto intermediate frequency signal path 44.

The frequency of intermediate frequency signals SIGIF may be equal to the frequency of THF signals 34 minus the difference between the frequency of optical local oscillator signal LO1 and the frequency of optical local oscillator signal LO2. As an example, intermediate frequency signals SIGIF may be at lower frequencies than THF signals 32 and 34 such as centimeter or millimeter wave frequencies between 10 GHz and 100 GHz, between 30 GHz and 80 GHz, around 60 GHz, etc. If desired, transceiver circuitry 26 (FIG. 1) may change the frequency of optical local oscillator signal LO1 and/or optical local oscillator signal LO2 when switching from transmission to reception or vice versa. UTC PD 42 may preserve the data modulation of THF signals 34 in intermediate signals SIGIF. A receiver in transceiver circuitry 26 (FIG. 1) may demodulate intermediate frequency signals SIGIF (e.g., after further downconversion) to recover the wireless data from THF signals 34. In another example, wireless circuitry 24 may convert intermediate frequency signals SIGIF to the optical domain before recovering the wireless data. In yet another example, intermediate frequency signal path 44 may be omitted and UTC PD 42 may convert THF signals 34 into the optical domain for subsequent demodulation and data recovery (e.g., in a sideband of the optical signal).

Figure 4:
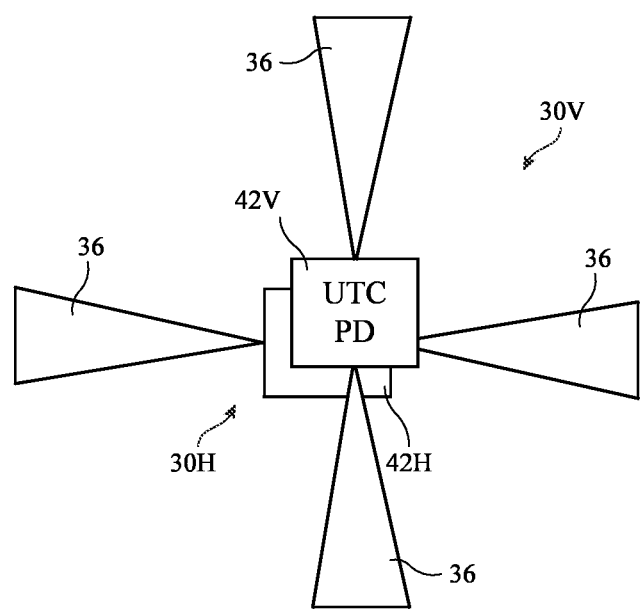
FIG. 4 is a top view showing how multiple antennas of the type shown in FIGS. 2 and 3 may be stacked to cover multiple polarizations in accordance with some embodiments.

The antenna 30 of FIGS. 2 and 3 may support transmission of THF signals 32 and reception of THF signals 34 with a given polarization (e.g., a linear polarization such as a vertical polarization). If desired, wireless circuitry 24 (FIG. 1) may include multiple antennas 30 for covering different polarizations. FIG. 4 is a diagram showing one example of how wireless circuitry 24 may include multiple antennas 30 for covering different polarizations.

As shown in FIG. 4, the wireless circuitry may include a first antenna 30 such as antenna 30V for covering a first polarization (e.g., a first linear polarization such as a vertical polarization) and may include a second antenna 30 such as antenna 30H for covering a second polarization different from or orthogonal to the first polarization (e.g., a second linear polarization such as a horizontal polarization). Antenna 30V may have a UTC PD 42 such as UTC PD 42V coupled between a corresponding pair of radiating element arms 36. Antenna 30H may have a UTC PD 42 such as UTC PD 42H coupled between a corresponding pair of radiating element arms 36 oriented non-parallel (e.g., orthogonal) to the radiating element arms 36 in antenna 30V. This may allow antennas 30V and 30H to transmit THF signals 32 with respective (orthogonal) polarizations and may allow antennas 30V and 30H to receive THF signals 32 with respective (orthogonal) polarizations.

To minimize space within device 10, antenna 30V may be vertically stacked over or under antenna 30H (e.g., where UTC PD 42V partially or completely overlaps UTC PD 42H). In this example, antennas 30V and 30H may both be formed on the same substrate such as a rigid or flexible printed circuit board. The substrate may include multiple stacked dielectric layers (e.g., layers of ceramic, epoxy, flexible printed circuit board material, rigid printed circuit board material, etc.). The radiating element arms 36 in antenna 30V may be formed on a separate layer of the substrate than the radiating element arms 36 in antenna 30H or the radiating element arms 36 in antenna 30V may be formed on the same layer of the substrate as the radiating element arms 36 in antenna 30H. UTC PD 42V may be formed on the same layer of the substrate as UTC PD 42H or UTC PD 42V may be formed on a separate layer of the substrate than UTC PD 42H. UTC PD 42V may be formed on the same layer of the substrate as the radiating element arms 36 in antenna 30V or may be formed on a separate layer of the substrate as the radiating element arms 36 in antenna 30V. UTC PD 42H may be formed on the same layer of the substrate as the radiating element arms 36 in antenna 30H or may be formed on a separate layer of the substrate as the radiating element arms 36 in antenna 30H.

Figure 5:
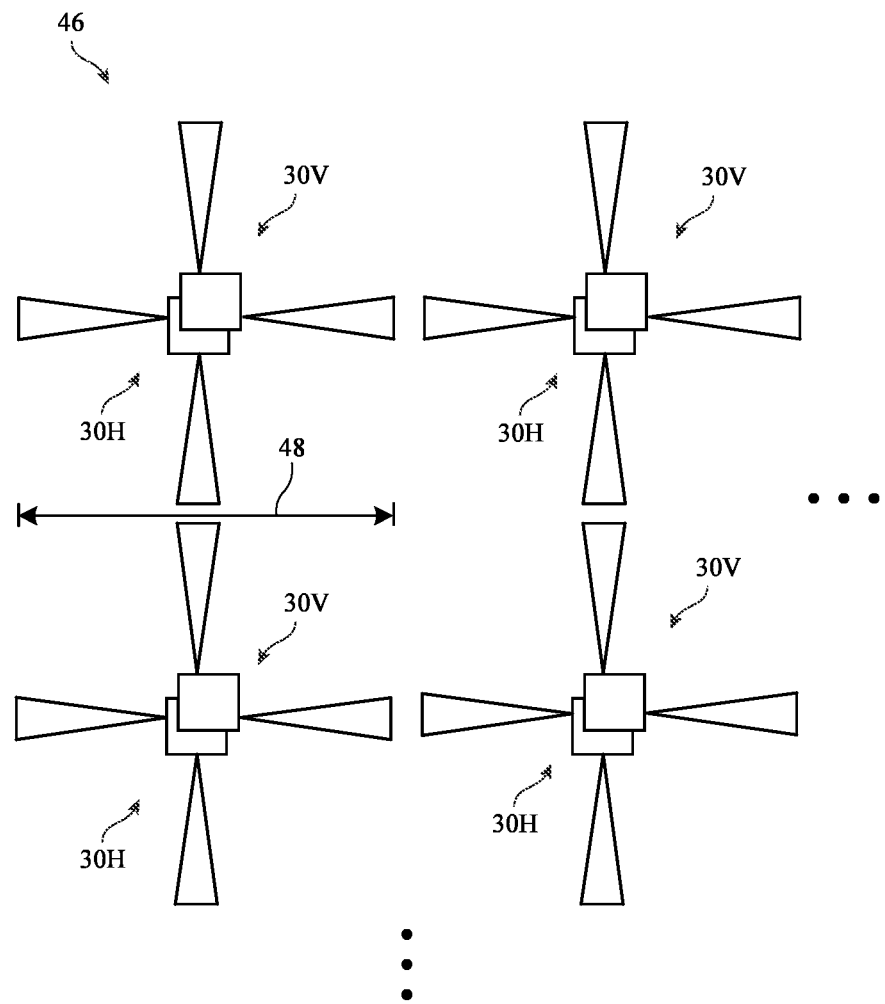
FIG. 5 is a top view showing how stacked antennas of the type shown in FIG. 4 may be integrated into a phased antenna array for conveying wireless signals at frequencies greater than about 100 GHz within a corresponding signal beam.

If desired, antennas 30 or antennas 30H and 30V of FIG. 4 may be integrated within a phased antenna array. FIG. 5 is a diagram showing one example of how antennas 30H and 30V may be integrated within a phased antenna array. As shown in FIG. 5, device 10 may include a phased antenna array 46 of stacked antennas 30H and 30V arranged in a rectangular grid of rows and columns. Each of the antennas in phased antenna array 46 may be formed on the same substrate. This is merely illustrative. In general, phased antenna array 46 (sometimes referred to as a phased array antenna) may include any desired number of antennas 30V and 30H (or non-stacked antennas 30) arranged in any desired pattern. Each of the antennas in phased antenna array 46 may be provided with a respective optical phase shift S (FIGS. 2 and 3) that configures the antennas to collectively transmit THF signals 32 and/or receive THF signals 34 that sum to form a signal beam of THF signals in a desired beam pointing direction. The beam pointing direction may be selected to point the signal beam towards external communications equipment, towards a desired external object, away from an external object, etc.

Phased antenna array 46 may occupy relatively little space within device 10. For example, each antenna 30V/30H may have a length 48 (e.g., as measured from the end of one radiating element arm to the opposing end of the opposite radiating element arm). Length 48 may be approximately equal to one-half the wavelength of THF signals 32 and 34. For example, length 48 may be as small as 0.5 mm or less. Each UTC-PD 42 in phased antenna array 46 may occupy a lateral area of 100 square microns or less. This may allow phased antenna array 46 to occupy very little area within device 10, thereby allowing the phased antenna array to be integrated within different portions of device 10 while still allowing other space for device components. The examples of FIGS. 2-5 are merely illustrative and, in general, each antenna may have any desired antenna radiating element architecture.

Figure 6:
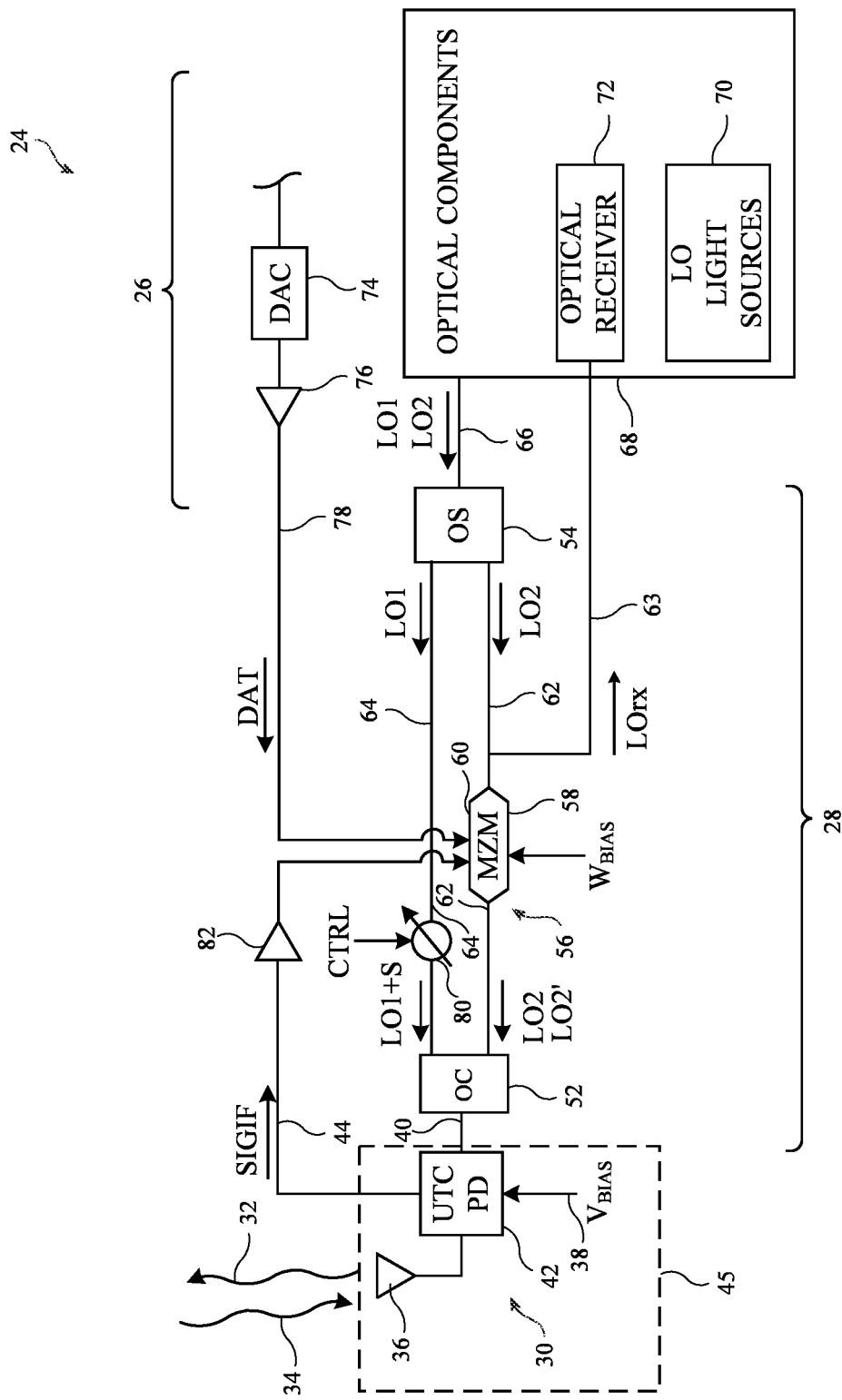
FIG. 6 is a circuit diagram of illustrative wireless circuitry having an antenna that transmits wireless signals at frequencies greater than about 100 GHz and that receives wireless signals at frequencies greater than about 100 GHz for conversion to intermediate frequencies and then to the optical domain in accordance with some embodiments.

FIG. 6 is a circuit diagram showing how a given antenna 30 and signal path 28 (FIG. 1) may be used to both transmit THF signals 32 and receive THF signals 34 based on optical local oscillator signals. In the example of FIG. 6, UTC PD 42 converts received THF signals 34 into intermediate frequency signals SIGIF that are then converted to the optical domain for recovering the wireless data from the received THF signals.

As shown in FIG. 6, wireless circuitry 24 may include transceiver circuitry 26 coupled to antenna 30 over signal path 28 (e.g., an optical signal path sometimes referred to herein as optical signal path 28). UTC PD 42 may be coupled between the radiating element arm(s) 36 of antenna 30 and signal path 28. Transceiver circuitry 26 may include optical components 68, amplifier circuitry such as power amplifier 76, and digital-to-analog converter (DAC) 74. Optical components 68 may include an optical receiver such as optical receiver 72 and optical local oscillator (LO) light sources (emitters) 70. LO light sources 70 may include two or more light sources such as laser light sources, laser diodes, optical phase locked loops, or other optical emitters that emit light (e.g., optical local oscillator signals LO1 and LO2) at respective wavelengths. If desired, LO light sources 70 may include a single light source and may include optical components for splitting the light emitted by the light source into different wavelengths. Signal path 28 may be coupled to optical components 68 over optical path 66. Optical path 66 may include one or more optical fibers and/or waveguides.

Signal path 28 may include an optical splitter such as optical splitter (OS) 54, optical paths such as optical path 64 and optical path 62, an optical combiner such as optical combiner (OC) 52, and optical path 40. Optical path 62 may be an optical fiber or waveguide. Optical path 64 may be an optical fiber or waveguide. Optical splitter 54 may have a first (e.g., input) port coupled to optical path 66, a second (e.g., output) port coupled to optical path 62, and a third (e.g., output) port coupled to optical path 64. Optical path 64 may couple optical splitter 54 to a first (e.g., input) port of optical combiner 52. Optical path 62 may couple optical splitter 54 to a second (e.g., input) port of optical combiner 52. Optical combiner 52 may have a third (e.g., output) port coupled to optical path 40.

An optical phase shifter such as optical phase shifter 80 may be (optically) interposed on or along optical path 64. An optical modulator such as optical modulator 56 may be (optically) interposed on or along optical path 62. Optical modulator 56 may be, for example, a Mach-Zehnder modulator (MZM) and may therefore sometimes be referred to herein as MZM 56. MZM 56 includes a first optical arm (branch) 60 and a second optical arm (branch) 58 interposed in parallel along optical path 62. Propagating optical local oscillator signal LO2 along arms 60 and 58 of MZM 56 may, in the presence of a voltage signal applied to one or both arms, allow different optical phase shifts to be imparted on each arm before recombining the signal at the output of the MZM (e.g., where optical phase modulations produced on the arms are converted to intensity modulations at the output of MZM 56). When the voltage applied to MZM 56 includes wireless data, MZM 56 may modulate the wireless data onto optical local oscillator signal LO2. If desired, the phase shifting performed at MZM 56 may be used to perform beam forming/steering in addition to or instead of optical phase shifter 80. MZM 56 may receive one or more bias voltages $W_{BIAS}$ (sometimes referred to herein as bias signals $W_{BIAS}$) applied to one or both of arms 58 and 60. Control circuitry 14 (FIG. 1) may provide bias voltage $W_{BIAS}$ with different magnitudes to place MZM 56 into different operating modes (e.g., operating modes that suppress optical carrier signals, operating modes that do not suppress optical carrier signals, etc.).

Intermediate frequency signal path 44 may couple UTC PD 42 to MZM 56 (e.g., arm 60). An amplifier such as low noise amplifier 82 may be interposed on intermediate frequency signal path 44. Intermediate frequency signal path 44 may be used to pass intermediate frequency signals SIGIF from UTC PD 42 to MZM 56. DAC 74 may have an input coupled to up-conversion circuitry, modulator circuitry, and/or baseband circuitry in a transmitter of transceiver circuitry 26. DAC 74 may receive digital data to transmit over antenna 30 and may convert the digital data to the analog domain (e.g., as data DAT). DAC 74 may have an output coupled to transmit data path 78. Transmit data path 78 may couple DAC 74 to MZM 56 (e.g., arm 60). Each of the components along signal path 28 may allow the same antenna 30 to both transmit THF signals 32 and receive THF signals 34 (e.g., using the same components along signal path 28), thereby minimizing space and resource consumption within device 10.

LO light sources 70 may produce (emit) optical local oscillator signals LO1 and LO2 (e.g., at different wavelengths that are separated by the wavelength of THF signals 32/34). Optical components 68 may include lenses, waveguides, optical couplers, optical fibers, and/or other optical components that direct the emitted optical local oscillator signals LO1 and LO2 towards optical splitter 54 via optical path 66. Optical splitter 54 may split the optical signals on optical path 66 (e.g., by wavelength) to output optical local oscillator signal LO1 onto optical path 64 while outputting optical local oscillator signal LO2 onto optical path 62.

Control circuitry 14 (FIG. 1) may provide phase control signals CTRL to optical phase shifter 80. Phase control signals CTRL may control optical phase shifter 80 to apply optical phase shift S to the optical local oscillator signal LO1 on optical path 64. Phase shift S may be selected to steer a signal beam of THF signals 32/34 in a desired pointing direction. Optical phase shifter 80 may pass the phase-shifted optical local oscillator signal LO1 (denoted as LO1+S) to optical combiner 52. Signal beam steering is performed in the optical domain (e.g., using optical phase shifter 80) rather than in the THF domain because there are no satisfactory phase shifting circuit components that operate at frequencies as high as the frequencies of THF signals 32 and 34. Optical combiner 52 may receive optical local oscillator signal LO2 over optical path 62. Optical combiner 52 may combine optical local oscillator signals LO1 and LO2 onto optical path 40, which directs the optical local oscillator signals onto UTC PD 42 for use during signal transmission or reception.

During transmission of THF signals 32, DAC 74 may receive digital wireless data (e.g., data packets, frames, symbols, etc.) for transmission over THF signals 32. DAC 74 may convert the digital wireless data to the analog domain and may output (transmit) the data onto transmit data path 78 as data DAT (e.g., for transmission via antenna 30). Power amplifier 76 may amplify data DAT. Transmit data path 78 may pass data DAT to MZM 56 (e.g., arm 60). MZM 56 may modulate data DAT onto optical local oscillator signal LO2 to produce modulated optical local oscillator signal LO2' (e.g., an optical local oscillator signal at the frequency/wavelength of optical local oscillator signal LO2 but that is modulated to include the data identified by data DAT). Optical combiner 52 may combine optical local oscillator signal LO1 with modulated optical local oscillator signal LO2' at optical path 40.

Optical path 40 may illuminate UTC PD 42 with (using) optical local oscillator signal LO1 (e.g., with the phase shift S applied by optical phase shifter 80) and modulated optical local oscillator signal LO2'. Control circuitry 14 (FIG. 1) may apply a control signal $V_{BIAS}$ to UTC PD 42 that configures antenna 30 for the transmission of THF signals 32. UTC PD 42 may convert optical local oscillator signal LO1 and modulated optical local oscillator signal LO2' into antenna currents on radiating element arm(s) 36 at the frequency of THF signals 32 (e.g., while programmed for transmission using control signal $V_{BIAS}$). The antenna currents on radiating element arm(s) 36 may radiate THF signals 32. The frequency of THF signals 32 is given by the difference in frequency between optical local oscillator signal LO1 and modulated optical local oscillator signal LO2'. Control signals $V_{BIAS}$ may control UTC PD 42 to preserve the modulation from modulated optical local oscillator signal LO2' in the radiated THF signals 32. External equipment that receives THF signals 32 will thereby be able to extract data DAT from the THF signals 32 transmitted by antenna 30.

During reception of THF signals 34, MZM 56 does not modulate any data onto optical local oscillator signal LO2. Optical path 40 therefore illuminates UTC PD 42 with optical local oscillator signal LO1 (e.g., with phase shift S) and optical local oscillator signal LO2. Control circuitry 14 (FIG. 1) may apply a control signal $V_{BIAS}$ (e.g., a bias voltage) to UTC PD 42 that configures antenna 30 for the receipt of THF signals 32. UTC PD 42 may use optical local oscillator signals LO1 and LO2 to convert the received THF signals 34 into intermediate frequency signals SIGIF output onto intermediate frequency signal path 44 (e.g., while programmed for reception using bias voltage $V_{BIAS}$). Intermediate frequency signals SIGIF may include the modulated data from the received THF signals 34. Low noise amplifier 82 may amplify intermediate frequency signals SIGIF, which are then provided to MZM 56 (e.g., arm 60). MZM 56 may convert intermediate frequency signals SIGIF to the optical domain as optical signals LOrx (e.g., by modulating the data in intermediate frequency signals SIGIF onto one of the optical local oscillator signals) and may pass the optical signals to optical receiver 72 in optical components 68, as shown by arrow 63 (e.g., via optical paths 62 and 66 or other optical paths). Control circuitry 14 (FIG. 1) may use optical receiver 72 to convert optical signals LOrx to other formats and to recover (demodulate) the data carried by THF signals 34 from the optical signals. In this way, the same antenna 30 and signal path 28 may be used for both the transmission and reception of THF signals while also performing beam steering operations.

The example of FIG. 6 in which intermediate frequency signals SIGIF are converted to the optical domain is merely illustrative. If desired, transceiver circuitry 26 may receive and demodulate intermediate frequency signals SIGIF without first passing the signals to the optical domain. For example, transceiver circuitry 26 may include an analog-to-digital converter (ADC), intermediate frequency signal path 44 may be coupled to an input of the ADC rather than to MZM 56, and the ADC may convert intermediate frequency signals SIGIF to the digital domain. As another example, intermediate frequency signal path 44 may be omitted and control signals $V_{BIAS}$ may control UTC PD 42 to directly sample THF signals 34 with optical local oscillator signals LO1 and LO2 to the optical domain. As an example, UTC PD 42 may use the received THF signals 34 and control signals $V_{BIAS}$ to produce an optical signal on optical path 40. The optical signal may have an optical carrier with sidebands that are separated from the optical carrier by a fixed frequency offset (e.g., 30-100 GHz, 60 GHz, 50-70 GHz, 10-100 GHz, etc.). The sidebands may be used to carry the modulated data from the received THF signals 34. Signal path 28 may direct (propagate) the optical signal produced by UTC PD 42 to optical receiver 72 in optical components 68 (e.g., via optical paths 40, 64, 62, 66, 63, and/or other optical paths). Control circuitry 14 (FIG. 1) may use optical receiver 72 to convert the optical signal to other formats and to recover (demodulate) the data carried by THF signals 34 from the optical signal (e.g., from the sidebands of the optical signal).

Figure 7:
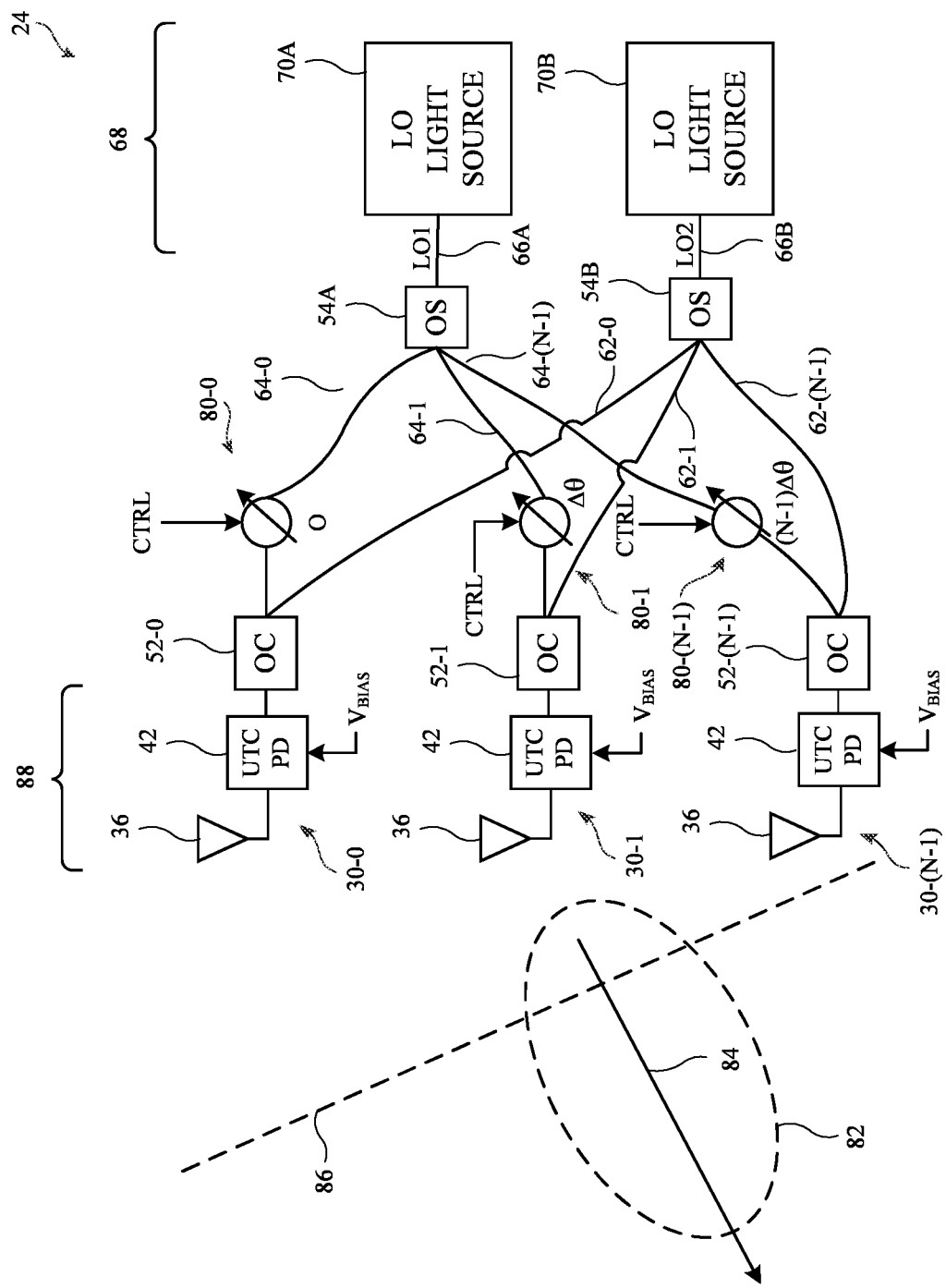
FIG. 7 is a circuit diagram of an illustrative phased antenna array that conveys wireless signals at frequencies greater than about 100 GHz within a corresponding signal beam in accordance with some embodiments.

FIG. 7 is a circuit diagram showing one example of how multiple antennas 30 may be integrated into a phased antenna array 88 that conveys THF signals over a corresponding signal beam. In the example of FIG. 7, MZMs 56, intermediate frequency signal paths 44, data paths 78, and optical receiver 72 of FIG. 6 have been omitted for the sake of clarity. Each of the antennas in phased antenna array 88 may alternatively sample received THF signals directly into the optical domain or may pass intermediate frequency signals SIGIF to ADCs in transceiver circuitry 26.

As shown in FIG. 7, phased antenna array 88 includes N antennas 30 such as a first antenna 30-0, a second antenna 30-1, and an Nth antenna 30-(N-1). Each of the antennas 30 in phased antenna array 88 may be coupled to optical components 68 via a respective optical signal path (e.g., optical signal path 28 of FIG. 6). Each of the N signal paths may include a respective optical combiner 52 coupled to the UTC PD 42 of the corresponding antenna 30 (e.g., the UTC PD 42 in antenna 30-0 may be coupled to optical combiner 52-0, the UTC PD 42 in antenna 30-1 may be coupled to optical combiner 52-1, the UTC PD 42 in antenna 30-(N-1) may be coupled to optical combiner 52-(N-1), etc.). Each of the N signal paths may also include a respective optical path 62 and a respective optical path 64 coupled to the corresponding optical combiner 52 (e.g., optical paths 64-0 and 62-0 may be coupled to optical combiner 52-0, optical paths 64-1 and 62-1 may be coupled to optical combiner 52-1, optical paths 64-(N-1) and 62-(N-1) may be coupled to optical combiner 52-(N-1), etc.).

Optical components 68 may include LO light sources 70 such as a first LO light source 70A and a second LO light source 70B. The optical signal paths for each of the antennas 30 in phased antenna array 88 may share one or more optical splitters 54 such as a first optical splitter 54A and a second optical splitter 54B. LO light source 70A may generate (e.g., produce, emit, transmit, etc.) first optical local oscillator signal LO1 and may provide first optical local oscillator signal LO1 to optical splitter 54A via optical path 66A. Optical splitter 54A may distribute first optical local oscillator signal LO1 to each of the UTC PDs 42 in phased antenna array 88 over optical paths 64 (e.g., optical paths 64-0, 64-1, 64-(N-1), etc.). Similarly, LO light source 70B may generate (e.g., produce, emit, transmit, etc.) second optical local oscillator signal LO2 and may provide second optical local oscillator signal LO2 to optical splitter 54B via optical path 66B. Optical splitter 54B may distribute second optical local oscillator signal LO2 to each of the UTC PDs 42 in phased antenna array 88 over optical paths 62 (e.g., optical paths 62-0, 62-1, 62-(N-1), etc.).

A respective optical phase shifter 80 may be interposed along (on) each optical path 64 (e.g., a first optical phase shifter 80-0 may be interposed along optical path 64-0, a second optical phase shifter 80-1 may be interposed along optical path 64-1, an Nth optical phase shifter 80-(N-1) may be interposed along optical path 64-(N-1), etc.). Each optical phase shifter 80 may receive a control signal CTRL that controls the phase S provided to optical local oscillator signal LO1 by that optical phase shifter (e.g., first optical phase shifter 80-0 may impart an optical phase shift of zero degrees/radians to the optical local oscillator signal LO1 provided to antenna 30-0, second optical phase shifter 80-1 may impart an optical phase shift of $\Delta\phi$ to the optical local oscillator signal LO1 provided to antenna 30-1, Nth optical phase shifter 80-(N-1) may impart an optical phase shift of $(N-1)\Delta\phi$ to the optical local oscillator signal LO1 provided to antenna 30-(N-1), etc.). By adjusting the phase S imparted by each of the N optical phase shifters 80, control circuitry 14 (FIG. 1) may control each of the antennas 30 in phased antenna array 88 to transmit THF signals 32 and/or to receive THF signals 34 within a formed signal beam 83. Signal beam 83 may be oriented in a particular beam pointing direction (angle) 84 (e.g., the direction of peak gain of signal beam 83). The THF signals conveyed by phased antenna array 88 may have wavefronts 86 that are orthogonal to beam pointing direction 84. Control circuitry 14 may adjust beam pointing direction 84 over time to point towards external communications equipment or an external object or to point away from external objects, as examples.

Phased antenna array 88 may be operable in an active mode in which the array transmits and/or receives THF signals using optical local oscillator signals LO1 and LO2 (e.g., using phase shifts provided to each antenna element to steer signal beam 83). If desired, phased antenna array 88 may also be operable in a passive mode in which the array does not transmit or receive THF signals. Instead, in the passive mode, phased antenna array 88 may be configured to form a passive reflector that reflects THF signals or other electromagnetic waves incident upon device 10. In the passive mode, the UTC PDs 42 in phased antenna array 88 are not illuminated by optical local oscillator signals LO1 and LO2 and transceiver circuitry 26 performs no modulation/demodulation, mixing, filtering, detection, modulation, and/or amplifying of the incident THF signals.

Antenna radiating element arm(s) 36 and UTC PD 42 (FIG. 6) may sometimes be referred to herein collectively as access point (AP) 45 (e.g., a THF access point). In some implementations, a single access point 45 is used to communicate with a single external device (e.g., another device such as device 10, a wireless base station or access point, or other wireless (THF) communications equipment). If desired, transceiver 26 may use multiple access points distributed across one or more locations to concurrently communicate with one or more external devices over one or more streams of wireless signals (e.g., THF signals 32 and 34 of FIG. 1).

Figure 8:
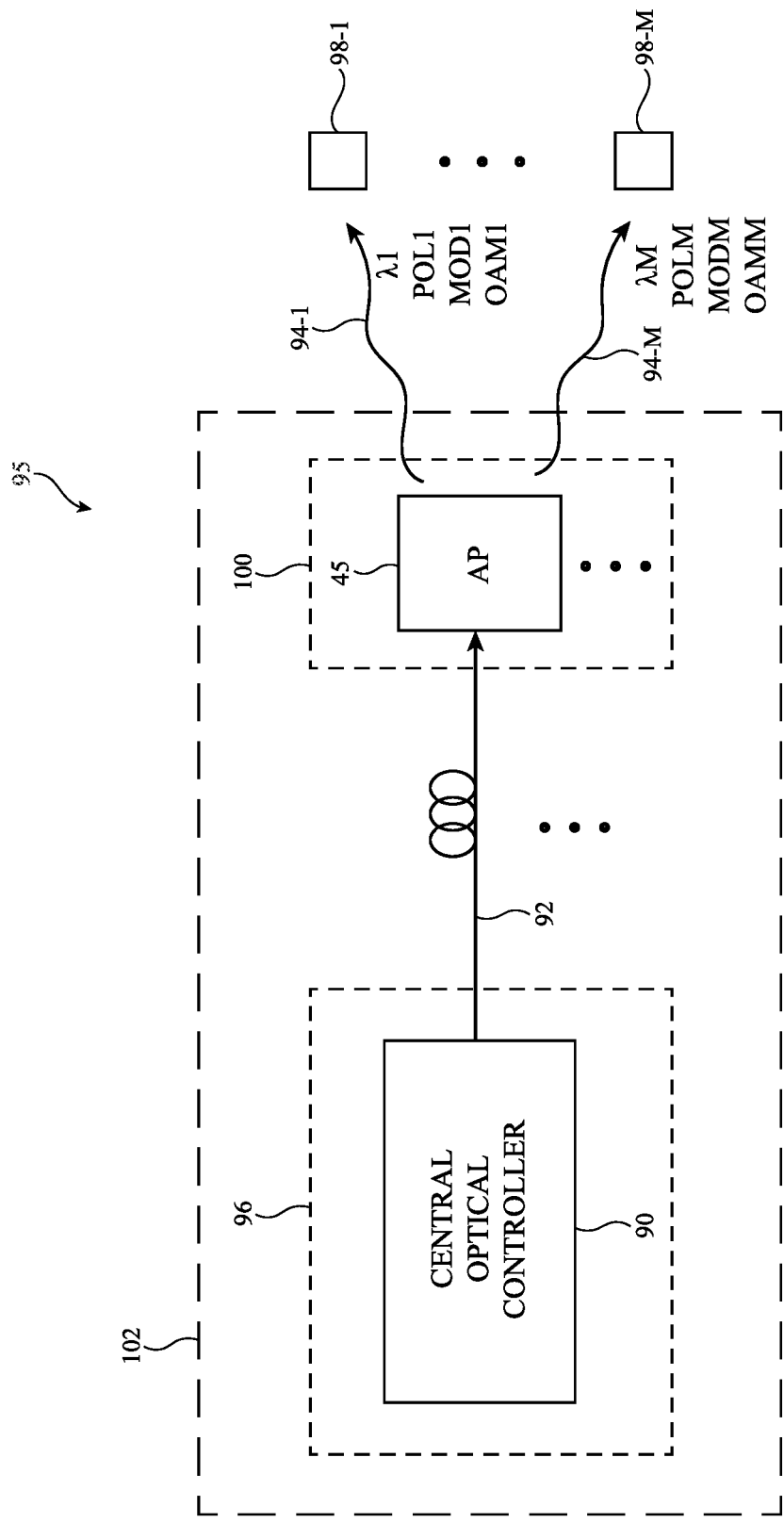
FIG. 8 is a diagram showing how an illustrative central optical controller may provide optical signals to one or more access points that convey multiple streams of wireless signals at frequencies greater than about 100 GHz based on the optical signals in accordance with some embodiments.

As shown in FIG. 8, wireless communications system 95 (sometimes referred to herein as THF system 95, wireless system 95, communications system 95, or simply as system 95) may include one or more access points such as access point 45. Access point 45 may include at least one photodiode 42 coupled to a corresponding antenna 30.

Wireless communications system 95 may also include a centralized optical controller such as central optical controller 90. Central optical controller 90 may sometimes also be referred to herein as central office 90, central chip 90, optical controller 90, or optical processor 90. Central optical controller 90 may include control circuitry such as control circuitry 14 of FIG. 1. The components of wireless circuitry 24 of FIG. 6 may be distributed between access points 45 and central optical controller 90 of FIG. 8. For example, central optical controller 90 may include transceiver 26 and signal path 28 of FIG. 6. Central optical controller 90 may be communicably coupled to access point 45 over an optical signal path such as optical path 92. Optical path 92 may include one or more optical fibers, for example.

Central optical controller 90 may be co-located with access point 45 or may be disposed at a location separated from access point 45. For example, central optical controller 90, optical path 92, and access point 45 may all be enclosed within an electronic device housing such as housing 102 (e.g., a housing such as housing 12 of FIG. 1). When configured in this way, central optical controller 90, optical path 92, and access point 45 may all form components of a corresponding device 10 (e.g., a single laptop computer, cellular telephone, tablet computer, wristwatch device, portable media player, home entertainment console, desktop computer, gaming controller, head-mounted device, etc.). In these examples, access points 45 may be distributed across multiple locations on device 10 (e.g., in respective corners of the device housing, at different sides of the device housing, etc.). For example, a single device such as a tablet computer or cellular telephone may include central optical controller 90, one or more access points (e.g., one or more antennas) at each corner, and dielectric waveguides or other optical paths that couple the central optical controller 90 to the one or more access points. As another example, central optical controller 90 may be enclosed within a first housing such as housing 96 (e.g., a housing such as housing 12 of FIG. 1) whereas access point 45 is enclosed within a second housing 100 (e.g., a housing such as housing 12 of FIG. 1). When configured in this way, central optical controller 90 may be located within a first device 10 whereas access point 45 is located within a second device 10.

In other words, wireless communications system 95 may be located within a single device 10 or may be distributed across multiple devices 10. In examples where the components of wireless communications system 95 are located within a single device 10, access point 45 may be separated from or co-located with central optical controller 90 within the device and optical path 92 may have a length on the order of inches, centimeters, or meters. In examples where the components of wireless communications system 95 are located within different devices 10, central optical controller 90 may be located in the same room or a different room of the same building or a different building as access point 45 or may be located in a different geographic region from access point 45 (e.g., optical path 92 may be as long as a few km, dozens of km, hundreds of km, or thousands of km in length). If desired, optical path 92 may include multiple optical fibers that are coupled together in series using optical couplers, optical boosters/amplifiers, optical relays, etc.

Central optical controller 90 may generate optical signals (e.g., optical LO signals) for access point 45. Central optical controller 90 may transmit the optical signals over optical path 92. Access point 45 may transmit wireless signals 94 (e.g., THF signals 32 of FIG. 1) using the optical signals. To maximize the overall data rate and/or flexibility of THF communications performed using device 10, device 10 may concurrently convey multiple streams of wireless data using THF signals 32/34 (FIG. 1). To support concurrent transmission of multiple streams of wireless data (sometimes referred to herein as wireless data streams), the optical signals used to control access point 45 to transmit THF signals need to have two or more orthogonal degrees of freedom (e.g., to prevent interference between the data streams prior to reaching the THF domain at the access point). Each degree of freedom may be associated with a separate wireless data stream. The degrees of freedom may include wavelength (frequency), electromagnetic polarization (e.g., vertical linear polarization, horizontal linear polarization, other polarizations, etc.), transverse optical modes, and orbital angular momentum, as examples.

The one or more access points in wireless communications system 95 may concurrently convey multiple streams of wireless data using M different sets of THF signals 94 (e.g., first THF signals 94-1, Mth THF signals 94-M, etc.). Access point(s) 45 may perform multi-user (MU) and/or single-user (SU) multiple input and multiple output (MIMO) communications, for example. In MU MIMO, the access point concurrently conveys multiple wireless data streams with multiple external devices 98 in parallel using wireless signals 94 (e.g., M external devices 98 such as a first device 98-1, an Mth device 98-M, etc.). In SU MIMO, the access point concurrently conveys multiple wireless data streams with a single external device 98 using wireless signals 94. Each external device 98 may be another device such as device 10, a wireless base station or access point, etc.

Each of the M THF signals 94 transmitted by access point(s) 45 may convey a respective one of the multiple wireless data streams. This means that each of the M THF signals 94 is generated by wireless communications system 95 using optical signals on optical path 92 having a respective combination of orthogonal degrees of freedom. For example, THF signals 94-1 (e.g., THF signals transmitted to a first external device 98-1) may be generated using optical signals on optical fiber 92 that have a first carrier wavelength $\lambda 1$, a first polarization POL1, a first (transverse) optical mode MOD1, and/or a first orbital angular momentum OAM1 whereas THF signals 94-M (e.g., THF signals transmitted to an Mth external device 98-M) may be generated using optical signals on optical path 92 that have an Mth carrier wavelength $\lambda M$, an Mth polarization POLM, an Mth (transverse) optical mode MODM, and/or an Mth orbital angular momentum OAMM. In general, the more degrees of freedom used to convey optical signals over optical path 92, the more concurrent/parallel wireless data streams are supported by wireless communications system 95. One or more of these orthogonal degrees of freedom (e.g., optical wavelength, polarization, transverse optical mode, orbital angular momentum, etc.) may be used to support additional parallel wireless data streams to maximize data rate and/or the number of external devices 98 that can be communicated with at once. The example of FIG. 8 is merely illustrative. Wireless communications system 95 may also receive THF signals that convey parallel wireless data streams and that are generated using similar optical degrees of freedom by one or more external devices 98.

Figure 9:
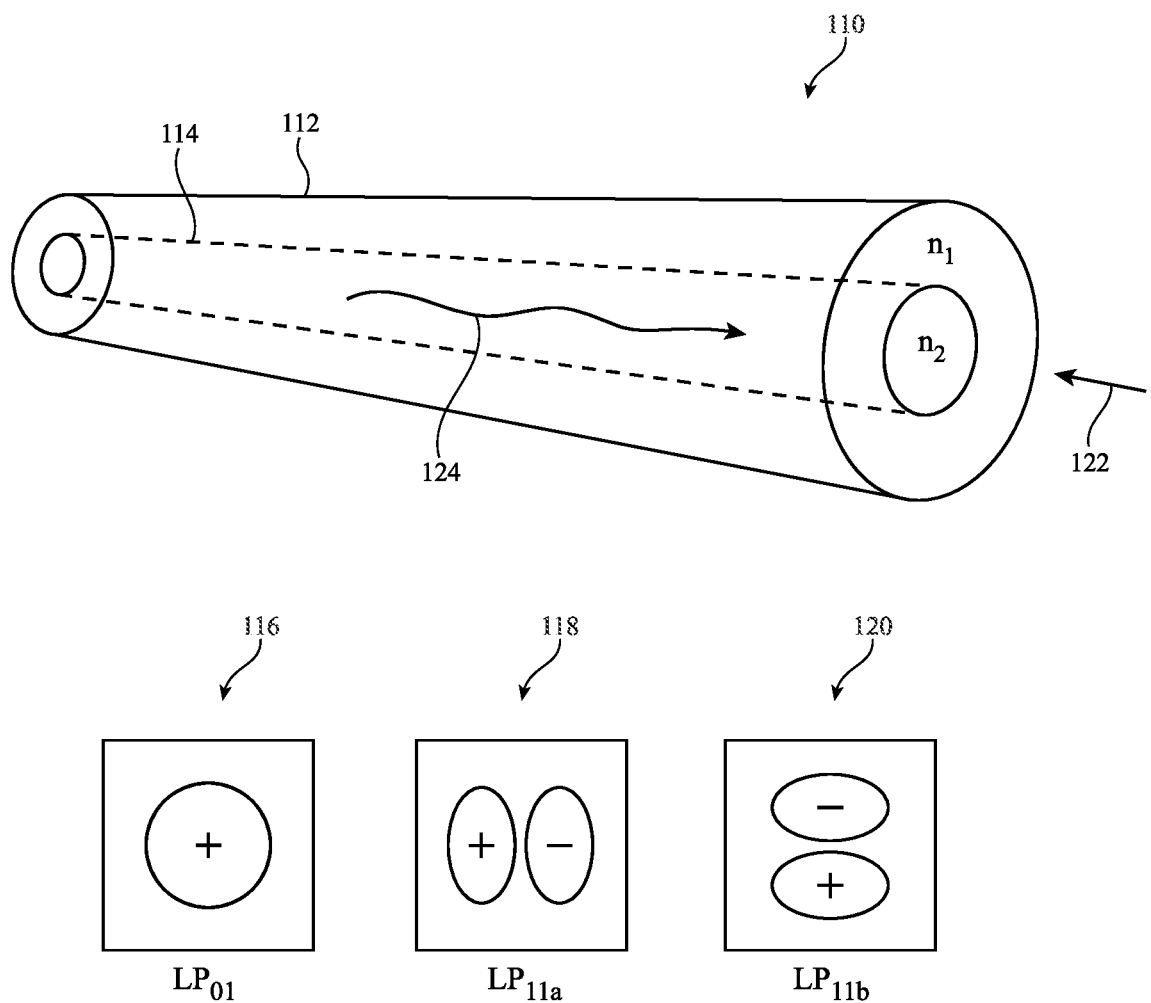
FIG. 9 is a diagram of an illustrative optical fiber that propagates optical signals having different transverse optical modes in accordance with some embodiments.

FIG. 9 is a diagram showing how an optical fiber in wireless communications system 95 may support optical signals that propagate using different transverse optical modes (e.g., optical modes MOD of FIG. 8). As shown in FIG. 9, wireless communications system 95 may include an optical fiber such as optical fiber 110. Optical fiber 110 may be used to form optical path 92 (FIG. 8) and/or other optical paths in wireless communications system 95.

Optical fiber 110 may include a high-index core such as core 114 and may include a low-index cladding such as cladding 112 that is wrapped (clad) around core 114. Cladding 112 may have a first refractive index (index of refraction) $n_1$. Core 114 may have a second refractive index $n_2$. Refractive index $n_2$ may be greater than refractive index $n_1$. This may configure optical fiber 110 to propagate light (optical signals 124) down its length via total internal reflection.

In step-index fibers where refractive index $n_1$ is uniformly distributed across core 114, the propagation constant $\beta$ of any guided mode is bounded by $(n_1 k_0, n_2 k_0)$, where $k_0$ is the propagation constant of light in a vacuum. The relative index difference $\Delta$ between the core and the cladding is defined as $\Delta = (n_1 - n_2)/n_1$. For optical communications, relative index difference $\Delta$ is generally on less than $10^{-2}$. As such, fiber modes are weakly guided. Under a weakly guided approximation, the vectorial modes of the fiber can be simplified using linear polarization (LP) modes.

As shown in FIG. 9, optical fiber 110 may be a step-index fiber having a circular cross-sectional area that increases along the length of the optical fiber. This may configure optical fiber 110 to convey optical signals 124 that propagate using multiple transverse (orthogonal) optical modes such as linear polarization modes LP (sometimes referred to herein as optical modes LP, orthogonal optical modes LP, transverse optical modes LP, or propagating modes LP). Each optical mode LP is transverse to and thus mathematically orthogonal to the other optical modes LP in optical fiber 110 (e.g., optical modes such as $LP_{02}$, $LP_{11}$, $LP_{12}$, $LP_{21}$, $LP_{22}$, $LP_{23}$, $LP_{13}$, $LP_{03}$, $LP_{04}$, $LP_{31}$, $LP_{32}$, $LP_{41}$, $LP_{42}$, $LP_{51}$, $LP_{61}$, $LP_{71}$, and/or higher order modes). The first and second subscripts of optical modes LP describe radial and azimuthal variations, respectively. Each optical mode may therefore be used to convey a respective stream of wireless data (e.g., for production of a corresponding one of the M wireless signals 94 of FIG. 8).

Optical fiber 110 may support a fundamental (transverse) optical mode $LP_{01}$ for optical signals 124. Graph 116 of FIG. 9 illustrates the cross-sectional energy (intensity) distribution of optical signals 124 in fundamental optical mode $LP_{01}$ while propagating down optical fiber 110 (e.g., as viewed in the direction of arrow 122). As shown by graph 116, in physical space, fundamental optical mode $LP_{01}$ involves a single symmetrical lobe of intensity centered on the center of optical fiber 110. The optical signals 124 conveyed along optical fiber 110 in fundamental optical mode $LP_{01}$ may be characterized by a corresponding propagation constant $\beta_{01}$ and a normalized mode profile $\psi_{01}(r,\theta)$ such that the power contained in the mode $A_{01}\psi_{01}(r,\theta)\exp(-j(\omega t - \beta_{01} z))$ is equal to $|A_{01}|^2$, where $A_{01}$ is a constant, r and $\theta$ are polar coordinates, j is the square root of $-1$, t is time, $\omega$ is angular frequency, and z is propagation distance.

When the diameter of optical fiber 110 is increased to a point at which the V number of the optical fiber (defined by equation 1) is greater than 2.405, the fiber can guide light in the next higher order optical mode from the fundamental mode, $LP_{11}$.

$$V = \left(\frac{2\pi}{\lambda}\right) a \sqrt{n_1^2 - n_2^2} \quad (1)$$

In equation 1, a is the radius of core 114. The higher order optical mode $LP_{11}$ is characterized by its propagation constant $\beta_{11}$ and the normalized mode profile $\psi_{11}(r,\theta)$. Optical mode $LP_{11}$ has a twofold degeneracy. Namely, optical fiber 110 may support two orthogonal optical modes $LP_{11}$ such as (transverse) optical mode $LP_{11a}$ and optical mode $LP_{11b}$, where optical mode $LP_{11b}$ is rotated at 90 degrees with respect to optical mode $LP_{11a}$ (e.g., where optical modes $LP_{10}$, $LP_{11a}$, and $LP_{11b}$ are all mathematically orthogonal and geometrically orthogonal to each other).

Graph 118 of FIG. 9 illustrates the cross-sectional energy (intensity) distribution of optical signals 124 in (transverse) optical mode $LP_{11a}$ and graph 120 illustrates the cross-sectional energy (intensity) distribution of optical signals 124 in (transverse) optical mode $LP_{11b}$ while propagating down optical fiber 110 (e.g., as viewed in the direction of arrow 122). As shown by graphs 118 and 120, in physical space, optical modes $LP_{11}$ each involve two symmetrical lobes of intensity that are of opposing polarity (denoted as + and −) and that are centered on the center of optical fiber 110. As shown by graphs 118 and 120, optical mode $LP_{11a}$ is oriented perpendicular (orthogonal) to optical mode $LP_{11b}$. In other words, fundamental optical mode $LP_{01}$, optical mode $LP_{11a}$, and optical mode $LP_{11b}$ are each orthogonal to each other. Optical signals 124 may propagate along optical fiber 110 concurrently in each of transverse optical modes $LP_{01}$, $LP_{11a}$, and $LP_{11b}$ (e.g., where optical modes $LP_{01}$, $LP_{11a}$, and $LP_{11b}$ are superimposed within the same volume of optical fiber 110). Optical modes $LP_{01}$, $LP_{11a}$, and $LP_{11b}$ may therefore each be used to convey a respective stream of wireless data to access point 45 (e.g., central optical controller 90 may modulate separate data streams onto transverse modes $L_{01}$, $LP_{11a}$, and $LP_{11b}$ for generating at least three different THF signals 94 for transmission to one or more external devices 98). The example of FIG. 9 is merely illustrative and, if desired, optical fiber 110 may support more than three optical modes LP, only two optical modes LP, and/or other optical modes LP (e.g., even higher order modes).

Figure 10:
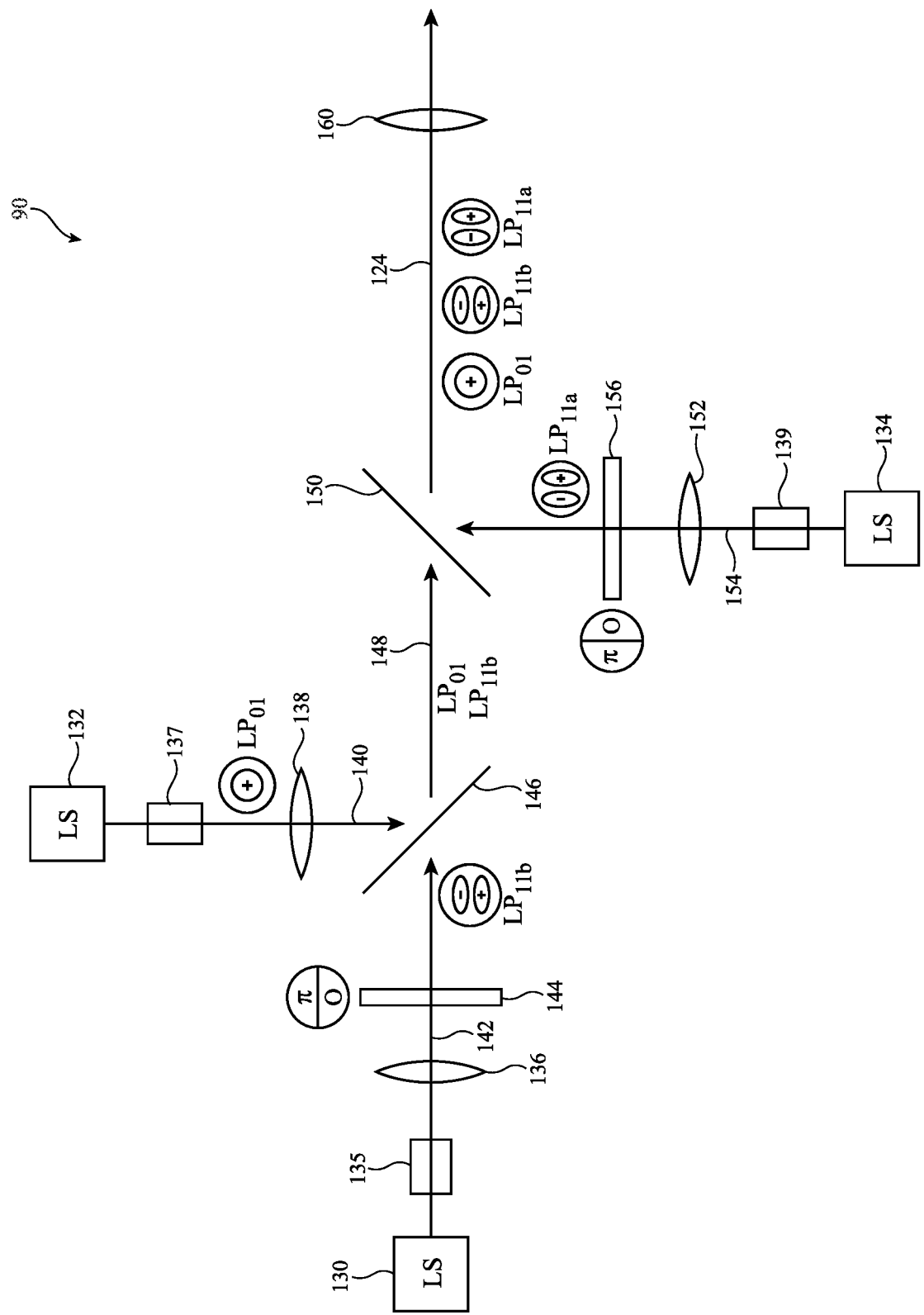
FIG. 10 is a diagram of an illustrative central optical controller that produces optical signals having different transverse optical modes for concurrently conveying different wireless data streams over the same optical fiber in accordance with some embodiments.

FIG. 10 is a diagram showing one example of how central optical processor 90 (FIG. 8) may produce optical signals 124 having multiple concurrent optical modes LP (e.g., for conveying multiple orthogonal wireless data streams). As shown in FIG. 10, central optical controller 90 may include light sources such as light sources 130, 132, and 134 (e.g., light sources such as light sources 70 of FIG. 6). Light sources 130, 132, and 134 may include light-emitting diodes or lasers, as examples.

Light source 130 may emit light 142, light source 132 may emit light 140, and light source 134 may emit light 154 (e.g., optical local oscillator signals). The light may be emitted by each of the light sources at the same wavelength, for example. Central optical controller 90 may include optical combiners 146 and 150 (e.g., partially reflective mirrors). A phase plate such as phase plate 144 may be optically interposed between light source 130 and optical combiner 146. A collimating lens such as lens 136 may be optically interposed between phase plate 144 and light source 130. An optical modulator such as optical modulator 135 may be optically interposed between lens 136 and light source 130. A collimating lens such as lens 138 may be optically interposed between optical combiner 146 and light source 132. An optical modulator such as optical modulator 137 may be optically interposed between lens 138 and light source 132. Optical combiner 150 may be optically interposed between optical combiner 146 and an output lens such as lens 160. A phase plate such as phase plate 156 may be optically interposed between light source 134 and optical combiner 150. A collimating lens such as lens 152 may be optically interposed between light source 134 and phase plate 156. An optical modulator such as optical modulator 139 may be optically interposed between lens 152 and light source 134.

Optical modulator 135 may modulate a first stream of wireless data onto light 142. Optical modulator 137 may modulate a second stream of wireless data onto light 140. Optical modulator 139 may modulate a third stream of wireless data onto light 154. Optical modulators 135, 137, and 139 may include MZMs, as one example. The light 140 emitted by light source 132 (and modulated by optical modulator 137) may be in fundamental optical mode $LP_{01}$. Collimating lens 138 may direct light 140 onto optical combiner 146.

The light emitted by light source 130 (and modulated by optical modulator 135) may be in the fundamental optical mode, for example. Collimating lens 136 may direct light 142 onto phase plate 144. Phase plate 144 may transform the fundamental optical mode of light 142 into a higher order mode, thereby outputting light 142 in a higher order mode orthogonal to the fundamental optical mode such as optical mode $LP_{11b}$. Phase plate 144 may be, for example, a thin glass plate with predetermined spatial distributions of refractive index and/or thickness such that light 142 is transmitted through the phase plate while outputting the light in optical mode $LP_{11b}$. The phase structure of the phase plate matches the spatial phase distribution of the desired mode profile. Because the fiber mode profile is similar to its Fourier transform, the phase plate can be placed at either the image plane or the Fourier plane of lens 136. Optical combiner 146 may combine light 140 (in fundamental optical mode $LP_{01}$) with light 142 (in optical mode $LP_{11b}$) to produce combined light 148. Combined light 148 may include the first stream of wireless data produced by optical modulator 135 propagating in optical mode $LP_{11b}$ superimposed with the stream of wireless data produced by optical modulator 137 in optical mode $LP_{01}$. Since the optical modes are orthogonal, the streams of wireless data will not interfere with each other.

At the same time, the light emitted by light source 134 (and modulated by optical modulator 139) may be in the fundamental optical mode, for example. Collimating lens 152 may direct light 154 onto phase plate 156. Phase plate 156 may transform the fundamental optical mode of light 154 into a higher order mode, thereby outputting light 154 in a higher order mode orthogonal to the fundamental optical mode and orthogonal to optical mode $LP_{11b}$ such as optical mode $LP_{11a}$ (e.g., phase plate 156 may be oriented perpendicular to phase plate 144 or may otherwise be configured to operate on light 154 in a manner perpendicular to the operation of phase plate 144). Phase plate 156 may be, for example, a thin glass plate with predetermined spatial distributions of refractive index and/or thickness such that light 154 is transmitted through the phase plate while outputting the light in optical mode $LP_{11a}$. The phase structure of the phase plate matches the spatial phase distribution of the desired mode profile. Because the fiber mode profile is similar to its Fourier transform, the phase plate can be placed at either the image plane or the Fourier plane of lens 152. The example of FIG. 10 is merely illustrative. If desired, phase plate 144 and/or phase plate 156 may be replaced with tunable spatial light modulators, liquid crystal on silicon (LCOS) panels, and/or any other desired optical components configured to impart incident light with a particular transverse optical mode (e.g., optical modes $LP_{11a}$ and $LP_{11b}$).

Optical combiner 150 may combine light 154 (in optical mode $LP_{11a}$) with combined light 148 (in optical modes $LP_{01}$ and $LP_{11b}$) to produce output light 124. Output light 124 may include the first stream of wireless data produced by optical modulator 135 propagating in optical mode $LP_{11b}$, superimposed with the second stream of wireless data produced by optical modulator 137 in optical mode $LP_{01}$, and superimposed with the third stream of wireless data produced by optical modulator 139 in optical mode $LP_{11a}$. Since the optical modes are orthogonal to each other, the three streams of wireless data will not interfere with each other. Output lens 160 may couple output light 124 onto an optical fiber (e.g., optical path 92 of FIG. 8) for distribution to one or more access points 45.

The example of FIG. 10 is merely illustrative. More than three light sources and/or additional optical paths may be used for generating even higher order modes of light for conveying additional wireless data streams (e.g., the optical fiber in optical path 92 may be a few-mode-fiber (FMF) with M optical modes allowing for concurrent transmission of M wireless data streams). Different polarizations and/or carrier frequencies (wavelengths) may also be used to convey additional concurrent and orthogonal wireless data streams. Other multiplexers such as spot-based multiplexers may be used instead of optical combiners 146 and 150 to reduce insertion loss from the optical combiners, if desired.

Figure 11:
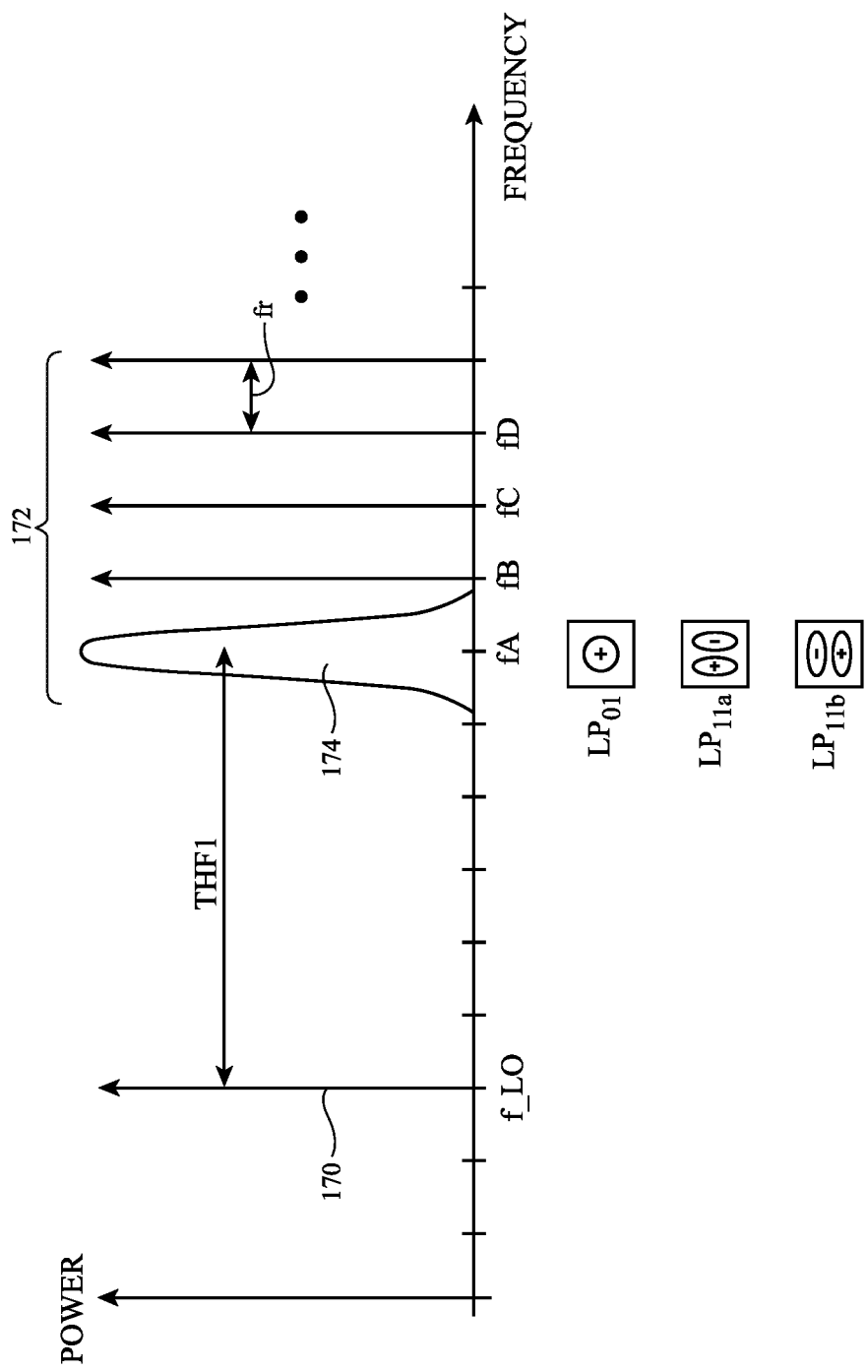
FIG. 11 is a plot of signal power as a function of frequency for illustrative optical signals having multiple transverse optical modes for conveying different wireless data streams in accordance with some embodiments.

FIG. 11 is a graph of illustrative output signals 124 (e.g., optical local oscillator signals) that may be produced on optical path 92 of FIG. 8 by central optical controller 90 of FIG. 10. The graph of FIG. 11 plots signal power as a function of frequency. As shown in FIG. 11, central optical controller 90 may add an optical LO signal 170 at a corresponding local oscillator frequency $f_{LO}$ to output signals 124 (e.g., using an additional light source). Output signals 124 may include modulated carrier 174 at carrier frequency $f_A$ (e.g., the frequency of the light 142, 140, and 154 emitted by light sources 130, 132, and 134 of FIG. 10).

Modulated carrier 174 may concurrently carry (convey) a first stream of wireless data in fundamental optical mode $LP_{01}$ (e.g., as produced by light source 132 and optical modulator 137), a second stream of wireless data in transverse optical mode $LP_{11b}$ (e.g., as produced by light source 130, optical modulator 135, and phase plate 144), and a third stream of wireless data in optical mode $LP_{11a}$ (e.g., as produced by light source 134, optical modulator 139, and phase plate 156). Modulated carrier 174 may be separated from local oscillator frequency $f_{LO}$ by frequency THF1. The access point(s) 45 that use optical LO signal 170 and one of the optical modes of modulated carrier 174 to convey THF signals will thereby convey the THF signals at frequency THF1.

If desired, central optical controller 90 may include a frequency comb generator that generates a set 172 of n uniformly-spaced carriers (spectral lines) at frequencies $f_A$, $f_B$, $f_C$, $f_D$, etc. Modulated carrier 174 may be, for example one of the carriers in set 172 that has been modulated with wireless data. Set 172 may sometimes also be referred to herein as optical frequency comb 172. Each carrier in optical frequency comb 172 may be at a respective carrier frequency and may be separated from one or two adjacent carriers by frequency $f_r$. The carriers in optical frequency comb 172 may sometimes also be referred to herein as optical carriers, frequency comb carriers, frequency comb components, spectral peaks, lines, or optical tones (e.g., set 172 may form a comb-shaped pattern of optical tones each at a respective carrier frequency and separated from one or two other optical tones in set 172 by the same frequency $f_r$).

If desired, more than one carrier from optical frequency comb 172 may be modulated with additional streams of wireless data (e.g., to perform wavelength multiplexing). Each carrier may be modulated with wireless data on two or more transverse optical modes similar to modulated carrier 174 if desired. Each carrier in optical frequency comb 172 that is modulated may serve to increase the total number of concurrent wireless data streams that are conveyed by output signals 124 and used to produce wireless signals 94 of FIG. 8.

The number of concurrent wireless data streams may be further increased by multiplexing different optical polarizations onto one or more of the carriers in optical frequency comb 172 and/or onto one or more of the different optical modes. The number of concurrent wireless data streams may be even further increased by multiplexing different orbital angular momenta onto one or more of the carriers, one or more of the optical modes, and/or one or more of the different polarizations. Time division duplexing may also be used. If desired, optical LO signal 170 may be added to output signal 124 using a light source in access point 45 (e.g., after the output signal has traversed optical path 92).

Figure 12:
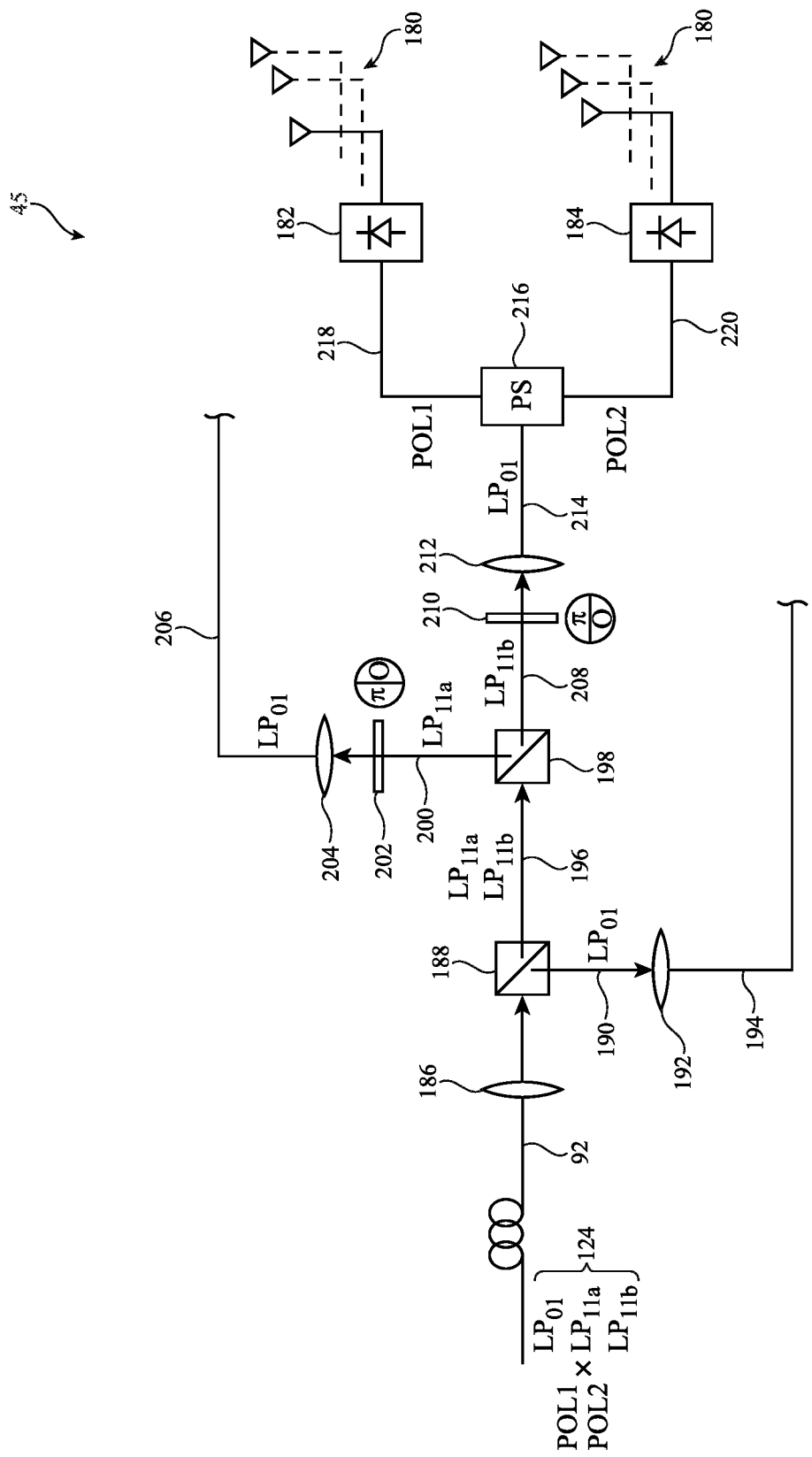
FIG. 12 is a diagram of one illustrative access point that may convey wireless signals using optical signals having different transverse optical modes in accordance with some embodiments.

Optical path 92 (FIG. 8) may convey output signal 124 to one or more access points 45 for use in transmitting wireless signals 94. FIG. 12 is a diagram showing one example of how an access point 45 may use output signal 124 to convey multiple wireless data streams. In the example of FIG. 12, output signal 124 includes six parallel wireless data streams multiplexed onto a single modulated carrier frequency (e.g., modulated carrier 174 of FIG. 11) using two different polarizations POL1 and POL2 (e.g., linear horizontal and vertical polarizations respectively) and three optical modes (e.g., fundamental optical mode $LP_{01}$, optical mode $LP_{11a}$, and optical mode $LP_{11b}$).

As shown in FIG. 12, access point 45 may include optical splitters 188 and 198, phase plates 202 and 210, lenses 186, 204, and 212, and optical paths 206, 214, and 194. Lens 186 may receive output signal 124 from central optical processor 90 over optical path 92. Lens 186 may direct output signal 124 onto optical splitter 188. Optical splitter 188 may separate both polarizations of the fundamental optical mode $LP_{01}$ in output signal 124 from both polarizations of higher order optical modes $LP_{11a}$ and $LP_{11b}$. Optical splitter 188 may direct fundamental optical mode $LP_{01}$ towards lens 192 as shown by arrow 190. Optical splitter 188 may direct higher order optical modes $LP_{11a}$ and $LP_{11b}$ to optical splitter 198 as shown by arrow 196. Lens 192 may direct fundamental optical mode $LP_{01}$ onto optical fiber 194 (e.g., a single mode fiber (SMF)).

Optical splitter 198 may separate both polarizations of optical mode $LP_{11a}$ from both polarizations of optical mode $LP_{11a}$. Optical splitter 198 may direct optical (transverse) mode $LP_{11a}$ towards lens 204 through phase plate 202 as shown by arrow 200. Optical splitter 198 may direct optical (transverse) mode $LP_{11b}$ towards lens 212 through phase plate 210 as shown by arrow 208. Phase plate 202 may convert the light in optical mode $LP_{11a}$ to fundamental optical mode $LP_{01}$. Lens 204 may direct optical mode $LP_{01}$ onto optical path 206 (e.g., an SMF). Similarly, phase plate 210 may convert the light in optical mode $LP_{11b}$ to fundamental optical mode $LP_{01}$. Lens 212 may direct optical mode $LP_{01}$ onto optical path 214 (e.g., an SMF). In this way, access point 45 may reverse the optical mode multiplexing performed by central optical processor 90 to produce three optical signals on optical paths 206, 214, and 194, each in respective independent fundamental optical modes $LP_{01}$.

In the example of FIG. 12, each of the optical signals on optical paths 206, 214, and 194 also includes two optical polarizations POL1 and POL2 multiplexed onto the fundamental optical mode $LP_{01}$. As shown in FIG. 12, access point 45 may include one or more polarization splitters such as polarization splitter (PS) 216. Polarization splitter 216 may receive the optical signal in fundamental mode $LP_{01}$ on optical path 214 and may split the optical signal into a first optical signal of polarization POL1 on optical path 218 and a second optical signal of polarization POL2 on optical path 220 (e.g., where the first and second optical signals convey respective independent wireless data streams).

The optical signal on optical path 218 may illuminate photodiode 182 (e.g., a UTC PD such as UTC PD 42 of FIG. 6). This may cause photodiode 182 to transmit corresponding THF signals (e.g., wireless signals 94 of FIG. 8) over a corresponding set of antennas 180 coupled to photodiode 182. The frequency of the THF signals may be given by the difference in frequency (e.g., the frequency gap) between the optical LO signal 170 at frequency f_LO and the modulated carrier 174 at frequency $f_A$ in the optical signal (e.g., frequency THF1 of FIG. 11). The set of antennas 180 may include one or more antenna radiating element arms 36 (FIG. 6) that share a single photodiode 182. The set of antennas 180 may, if desired, form a phased antenna array.

Similarly, the optical signal on optical path 220 may illuminate photodiode 184 (e.g., a UTC PD such as UTC PD 42 of FIG. 6). This may cause photodiode 184 to transmit corresponding THF signals (e.g., wireless signals 94 of FIG. 8) over a corresponding set of antennas 180 coupled to photodiode 184. The frequency of the THF signals may be given by the difference in frequency (e.g., the frequency gap) between the optical LO signal 170 at frequency f_LO and the modulated carrier 174 at frequency $f_A$ in the optical signal (e.g., frequency THF1 of FIG. 11). The set of antennas 180 may include one or more antenna radiating element arms 36 (FIG. 6) that share a single photodiode 184. If desired, the set of antennas 180 coupled to photodiode 182 may form antenna 30V of FIG. 4 whereas the set of antennas 180 coupled to photodiode 184 forms antenna 30H of FIG. 4. The THF signals transmitted by photodiode 182 may be at a first polarization whereas the THF signals transmitted by photodiode 184 are at the second polarization.

Access point 45 may include similar photodiodes and antennas for transmitting THF signals based on the two polarizations of optical signals on optical paths 206 and 194 (e.g., access point 45 may include six total photodiodes for conveying six independent streams of wireless data, each corresponding to a respective combination of polarizations POL1/POL2 and optical modes $LP_{01}/LP_{11a}/LP_{11b}$). The optical signal on optical path 206 may be used to transmit THF signals to a first external device 98, the optical signals on optical path 214 may be used to transmit THF signals to a second external device 98, and the optical signals on optical path 194 may be used to transmit THF signals to a third external device 98, for example.

The example of FIG. 12 is merely illustrative. Access point 45 may equivalently receive THF signals in concurrent parallel wireless data streams using output signal 124 (e.g., where the output signal is not modulated with wireless data). Output signal 124 may include any desired combination of any desired number of frequencies (e.g., across optical frequency comb 172 of FIG. 11), polarizations (e.g., polarizations POL1 and POL2), and/or optical modes (e.g., optical modes $LP_{01}$, $LP_{11a}$, $LP_{11b}$, and/or higher order modes). Each combination may correspond to a respective wireless data stream that may be conveyed by access point 45 in parallel. In general, access point 45 may include a respective photodiode and set of antennas 180 for each wireless data stream. Optical paths 206, 214, and 194 may include waveguides if desired. Offloading the optical multiplexing for the parallel wireless data streams to central optical controller 90 may serve to minimize the resources and power consumed by access point 45, for example.

If desired, the number of concurrent wireless data streams (optical degrees of freedom) handled by wireless communications system 95 may be further increased by multiplexing different orbital angular momenta (OAMs, sometimes also referred to as AOMs) onto the optical signals (e.g., using OAM multiplexing alone or in combination with wavelength, polarization, and/or optical mode multiplexing). OAM beams can have an unlimited number of states and are sometimes referred to as twisted OAM beams. If desired, the wireless data may be mapped into higher order modulation formats such as quadrature phase-shift keying (QPSK) and quadrature amplitude modulation (QAM).

Due to orthogonality, the superposition of an OAM with another mode having the opposite topological charge may allow the generation of a new mode with a petal-like transverse intensity profile orthogonal to other OAM states. The synthesis of OAM modes with distinct |l| can further be used as independent data carriers orthogonal to the other states. OAM fiber modes can be denoted as $OAM_{1,m}$, where l is the azimuthal index and m is the number of concentric radial rings in the transverse intensity profile of the modes. OAM fiber modes can be expressed as functions of hybrid HE or EH modes, as shown in equations 2 and 3.

$$OAM_{\pm l,m}^{\pm} = HE_{l+1,m}^{even} \pm jHE_{l+1,m}^{odd} \quad (2)$$

$$OAM_{\pm l,m}^{\mp} = EH_{l-1,m}^{even} \pm jEH_{l-1,m}^{odd} \quad (3)$$

In equations 2 and 3, the subscripts refer to the handedness of the rotation of the circular polarization states. $HE_{l+1,m}^{even}$ ($EH_{l-1,m}^{even}$) and $HE_{l+1,m}^{odd}$ ($EH_{l-1,m}^{odd}$) are degenerate (e.g., have the same effective refractive index), which means that the linear combination modes $OAM_{\pm l,m}^{\pm}(OAM_{\pm l,m}^{\mp})$ are also eigenmodes of the fiber and can be used as independent data carriers.

OAM is only a subspace of the full Laguerre Gaussian (LG) mode basis. The LG beams form a complete orthonormal basis and are characterized by the azimuthal index l and radial index p, where the former is responsible for the OAM. The LG modes are described by equation 4.

$$E_{(p,l)}^{LG}(r, \phi, z) = \frac{1}{\omega(z)} \sqrt{\frac{1p!}{\pi(|l|+p)!}} \exp(j(2p+|l|+1)\Phi(z)) \times \left(\frac{r\sqrt{2}}{\omega(z)}\right)^{|l|} L_p^{|l|}\left(\frac{2r^2}{\omega^2(z)}\right) \times \exp\left(\frac{-jkr^2}{2R(z)} - \frac{-r^2}{\omega^2(z)} + jl\phi\right) \quad (4)$$

Figure 13:
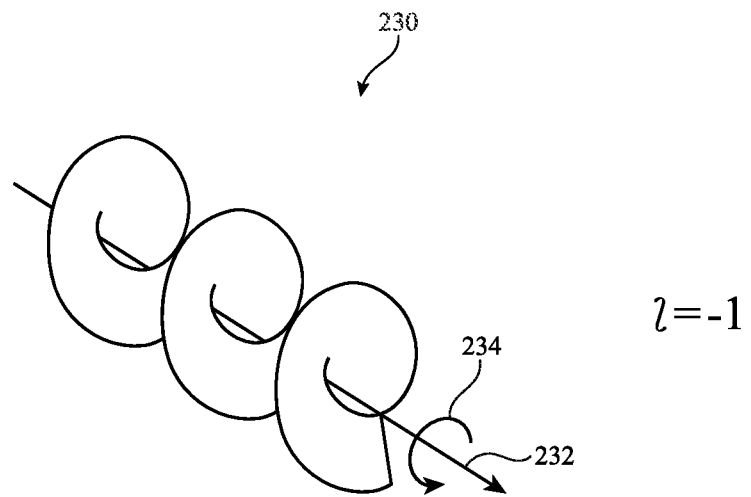
FIG. 13 is a diagram showing how illustrative optical signals may be provided with different orbital angular momenta for concurrently conveying different wireless data streams in accordance with some embodiments.
Figure 13:
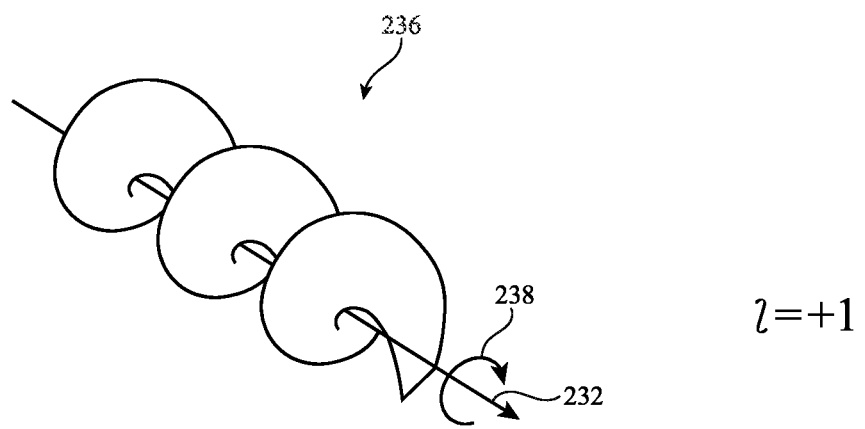

FIG. 13 is a perspective view of two illustrative orthogonal OAM modes that may be used to concurrently convey respective streams of wireless data along optical path 92 (FIG. 8). As shown in FIG. 13, optical signal 230 has a first OAM with l=−1, where the intensity of the signal follows a right-handed spiral shape around propagation direction (axis) 232, as shown by arrow 234. Optical signal 236 has a second OAM with l=+1, where the intensity of the signal follows a left-handed spiral shape around propagation direction 232, as shown by arrow 238. Optical signals 230 and 236 are orthogonal and may be superimposed on the same volume of optical fiber (e.g., in optical path 92) to independently convey respective wireless data streams. Access point 45 may include optical structures that separate optical signal 230 from optical signal 236 (e.g., that separate the optical signals by OAM) for generation of respective THF signals (e.g., wireless signals 94 of FIG. 8). Such OAM multiplexing may be the only multiplexing used by wireless communications system 95 or may be combined with wavelength multiplexing, polarization multiplexing, and/or optical mode multiplexing to increase the number of parallel streams of wireless data supported by the system.

Figure 14:
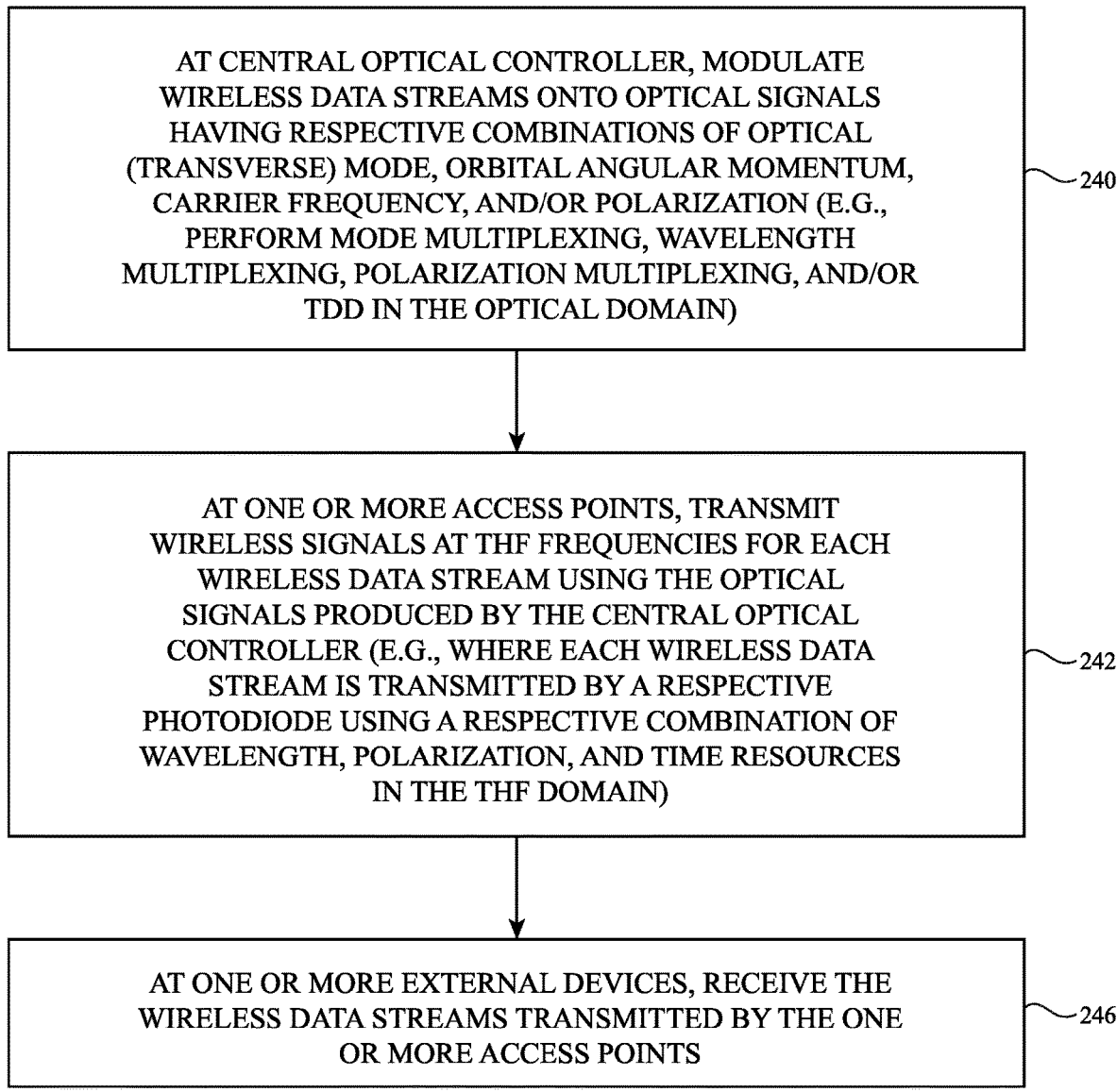
FIG. 14 is a flow chart of illustrative operations that may be involved in conveying multiple wireless data streams at frequencies greater than or equal to about 100 GHz using optical signals provided with different orthogonal characteristics in accordance with some embodiments.

FIG. 14 is a flow chart of illustrative operations that may be performed by wireless communications system 98 and one or more external devices 10 to communicate using multiple streams of wireless data.

At operation 240, central optical controller 90 may output optical signals on optical path 92. The optical signals may include multiple wireless data streams for transmission to one or more external devices 98 (e.g., to M external devices 98 as shown in FIG. 8). Central optical controller 90 may utilize multiplexing over one or more orthogonal degrees of freedom of the optical fiber in optical path 92 to independently convey the wireless data streams. For example, central optical controller 90 may generate output signals 124 having wireless data streams modulated onto different respective combinations of optical mode (e.g., optical modes $LP_{01}$, $LP_{11a}$, $LP_{11b}$, etc.), carrier wavelength (e.g., within optical frequency comb 172 of FIG. 11), polarization (e.g., POL1 and POL2 of FIG. 12), and/or orbital angular momentum (e.g., using optical signals 230 at l=−1 and optical signals 236 having l=+1 as shown in FIG. 13). In other words, central optical controller 90 may perform optical mode multiplexing, wavelength multiplexing, OAM multiplexing, and/or polarization multiplexing on output signals 124. Each combination of these factors may have its own respective modulation order if desired. Central optical controller 90 may also perform time division duplexing (TDD) of wireless data if desired. Central optical controller 90 may provide output signals 124 to one or more access points 45 over optical path(s) 92.

At operation 242, one or more access points 45 may transmit wireless signals 94 (FIG. 8) at THF frequencies given by the difference in frequency between the optical LO signal frequency f_LO and the one or more carrier frequencies in output signals 124. Access point(s) 45 may transmit respective wireless signals that carry each of the wireless data streams (in the THF domain) corresponding to each combination of optical mode, carrier wavelength, polarization, and/or orbital angular momentum in output signals 124 (in the optical domain) Access point(s) 45 may transmit the wireless signals to one or more external devices 98 (e.g., using an SU MIMO scheme or an MU MIMO scheme). In other words, the access point(s) may transmit each wireless data stream (from the optical domain) using a respective photodiode and corresponding antenna(s) and a respective combination of wavelength, polarization, and/or time resources in the THF domain.

At operation 246, one or more external devices 98 may receive each of the wireless data streams transmitted by the one or more access points 45. For example, there may be M external devices 98 that each receive respective wireless signals 94 that convey respective wireless data streams. One or more external devices 98 may receive multiple wireless data streams. The example of FIG. 14 is merely illustrative and, if desired, the optical signals may be unmodulated (e.g., for the reception of multiple streams of THF signals at wireless communications system 95).

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users. The optical components described herein (e.g., MZM modulator(s), waveguide(s), phase shifter(s), UTC PD(s), etc.) may be implemented in plasmonics technology if desired.

The methods and operations described above in connection with FIGS. 1-13 (e.g., the operations of FIGS. 10 and 13) may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry 18 of FIG. 1, etc.). The processing circuitry may include microprocessors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. A communication system comprising:
   optical components configured to generate an optical signal having a first data stream modulated onto a first optical mode of the optical signal and having a second data stream modulated onto a second optical mode of the optical signal, the second optical mode being orthogonal to the first optical mode;
   a light source configured to add an optical local oscillator (LO) signal to the optical signal;
   a first antenna radiating element;
   a first photodiode coupled to the first antenna radiating element, the first photodiode being configured to transmit first wireless signals over the first antenna radiating element based on the optical LO signal and the first optical mode of the optical signal;
   a second antenna radiating element; and
   a second photodiode coupled to the second antenna radiating element, the second photodiode being configured to transmit second wireless signals over the second antenna radiating element based on the optical LO signal and the second optical mode of the optical signal.

2. The communication system of claim 1, wherein the first optical mode comprises a fundamental mode of the optical signal and the second optical mode comprises a mode of the optical signal of higher order than the fundamental mode.

3. The communication system of claim 2, wherein the optical signal has a third data stream modulated onto a third optical mode of the optical signal, the third optical mode being orthogonal to the first optical mode and the second optical mode.

4. The communication system of claim 3, wherein the third optical mode comprises the mode of the optical signal of higher order than the fundamental mode.

5. The communication system of claim 4, further comprising:
   a third antenna radiating element; and
   a third photodiode coupled to the third antenna radiating element, the third photodiode being configured to transmit third wireless signals over the third antenna radiating element based on the optical LO signal and the third optical mode of the optical signal.

6. The communication system of claim 1, wherein the first optical mode and the second optical mode of the optical signal are modulated onto a carrier that is separated in frequency from the optical LO signal by a gap frequency greater than or equal to 100 GHz, the first photodiode being configured to transmit the first wireless signals at the gap frequency and the second photodiode being configured to transmit the second wireless signals at the gap frequency.

7. The communication system of claim 1, wherein the first optical mode of the optical signal is modulated onto a first carrier that is separated in frequency from the optical LO signal by a first gap frequency greater than or equal to 100 GHz and the second optical mode of the optical signal is modulated onto a second carrier that is higher in frequency than the first carrier.

8. The communication system of claim 7, wherein the first optical mode of the optical signal and the first wireless signals are at a first polarization and the second optical mode of the optical signal and the second wireless signals are at a second polarization orthogonal to the first polarization.

9. The communication system of claim 8, wherein the first optical mode of the optical signal has a first orbital angular momentum and the second optical mode of the optical signal has a second orbital angular momentum opposite the first orbital angular momentum.

10. The communication system of claim 7, wherein the first optical mode of the optical signal has a first orbital angular momentum and the second optical mode of the optical signal has a second orbital angular momentum opposite the first orbital angular momentum.

11. The communication system of claim 1, wherein the first optical mode of the optical signal and the first wireless signals are at a first polarization and the second optical mode of the optical signal and the second wireless signals are at a second polarization orthogonal to the first polarization.

12. The communication system of claim 11, wherein the first optical mode of the optical signal has a first orbital angular momentum and the second optical mode of the optical signal has a second orbital angular momentum opposite the first orbital angular momentum.

13. The communication system of claim 1, wherein the first optical mode of the optical signal has a first orbital angular momentum and the second optical mode of the optical signal has a second orbital angular momentum opposite the first orbital angular momentum.

14. The communication system of claim 1, wherein the optical components comprise:
a first additional light source and a phase plate configured to generate the first optical mode of the optical signal;
a second additional light source configured to generate the second optical mode of the optical signal; and
an optical combiner configured to combine the first optical mode of the optical signal with the second optical mode of the optical signal.

15. A communication system comprising:
an optical path;
optical components configured to generate an optical signal on the optical path, the optical signal having a first data stream and a second data stream modulated onto the optical signal, the first data stream being carried by a first orbital angular momentum of the optical signal, and the second data stream being carried by a second orbital angular momentum of the optical signal that is opposite the first orbital angular momentum;
a light source configured to generate an optical local oscillator (LO) signal in the optical signal;
a first antenna radiating element;
a first photodiode coupled to the first antenna radiating element, the first photodiode being configured to transmit first wireless signals over the first antenna radiating element based on the optical LO signal and the first orbital angular momentum of the optical signal;
a second antenna radiating element; and
a second photodiode coupled to the second antenna radiating element, the second photodiode being configured to transmit second wireless signals over the second antenna radiating element based on the optical LO signal and the second orbital angular momentum of the optical signal.

16. The communication system of claim 15, wherein the first data stream and the second data stream are modulated onto a carrier of the optical signal that is offset in frequency from the optical LO signal by at least 100 GHz.

17. The communication system of claim 15, wherein the first photodiode comprises a first uni-travelling-carrier photodiode (UTC PD) and the second photodiode comprises a second UTC PD.

18. A method of operating a communication system comprising:
modulating a first wireless data stream onto a first transverse mode of an optical signal at a carrier frequency;
modulating a second wireless data stream onto a second transverse mode of the optical signal at the carrier frequency, the second transverse mode being orthogonal to the first transverse mode;
with one or more optical paths, illuminating a first photodiode using the first transverse mode of the optical signal and an optical local oscillator (LO) signal and illuminating a second photodiode using the second transverse mode of the optical signal and the optical LO signal;
with the first photodiode, transmitting the first wireless data stream to a first device at a frequency greater than or equal to 100 GHz over a first antenna radiating element using the first transverse mode of the optical signal and the optical LO signal; and
with the second photodiode, transmitting the second wireless data stream to a second device at the frequency over a second antenna radiating element using the second transverse mode of the optical signal and the optical LO signal.

19. The method of claim 18, wherein first transverse mode comprises a fundamental mode of the optical path and the second transverse mode comprises a mode of the optical path that is of higher order than the fundamental mode.

20. The method of claim 18, wherein the first transverse mode of the optical signal has a polarization and the second transverse mode of the optical signal has the polarization.

* * * * *